(12) United States Patent
Smith et al.

(10) Patent No.: US 7,625,627 B2
(45) Date of Patent: *Dec. 1, 2009

(54) DECORATIVE POLYVINYL BUTYRAL SOLAR CONTROL LAMINATES

(75) Inventors: Rebecca L. Smith, Vienna, WV (US); Richard A. Hayes, Beaumont, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/647,735

(22) Filed: Dec. 29, 2006

(65) Prior Publication Data

US 2007/0196629 A1 Aug. 23, 2007

Related U.S. Application Data

(60) Provisional application No. 60/755,154, filed on Dec. 30, 2005.

(51) Int. Cl.
| B32B 7/14 | (2006.01) |
| B32B 5/16 | (2006.01) |
| B32B 7/02 | (2006.01) |
| B32B 27/36 | (2006.01) |
| B32B 27/32 | (2006.01) |

(52) U.S. Cl. .................. 428/201; 428/206; 428/214; 428/215; 428/483; 428/523; 428/203; 428/447; 428/911

(58) Field of Classification Search ................ 428/32.1, 428/195.1, 200, 201, 203, 213, 214, 206, 428/215, 447, 483, 523, 911
See application file for complete search history.

(56) References Cited

U.S. PATENT DOCUMENTS

| 3,341,399 A | * | 9/1967 | Hazdra et al. ............... 428/429 |
| 3,354,025 A | * | 11/1967 | Aykanian et al. ............. 428/441 |
| 3,922,456 A | * | 11/1975 | Baldridge .................... 428/203 |
| 4,027,061 A | * | 5/1977 | Cartier et al. ................ 428/213 |
| 4,339,567 A | | 7/1982 | Green et al. |
| 4,383,025 A | | 5/1983 | Green et al. |
| 4,398,014 A | | 8/1983 | Green et al. |
| 4,624,912 A | | 11/1986 | Zweifel et al. |
| 5,656,365 A | * | 8/1997 | Dages ......................... 428/221 |
| 5,914,178 A | | 6/1999 | Sol et al. |
| 6,261,684 B1 | * | 7/2001 | Takahashi et al. ............ 428/345 |
| 2003/0203167 A1 | | 10/2003 | Bell et al. |
| 2004/0187732 A1 | | 9/2004 | Roman et al. |
| 2004/0234735 A1 | | 11/2004 | Reynolds et al. |
| 2005/0072455 A1 | * | 4/2005 | Gerhardinger et al. ...... 136/243 |
| 2007/0098964 A1 | | 5/2007 | Yacovone |
| 2007/0125490 A1 | | 6/2007 | Elwakil et al. |

FOREIGN PATENT DOCUMENTS

| DE | 19643404 A1 | * | 4/1998 |
| EP | 0 035 969 B1 | | 9/1981 |
| EP | 0 044 274 B1 | | 1/1982 |
| EP | 0 054 509 B1 | | 6/1982 |
| EP | 0 153 904 B1 | | 9/1985 |
| EP | 0 160 510 B1 | | 11/1985 |
| EP | 0 164 314 B1 | | 12/1985 |
| EP | 0 418 123 B1 | | 3/1991 |
| EP | 0 556 649 B1 | | 8/1993 |
| EP | 0 947 566 B1 | | 10/1999 |
| EP | 1 129 844 A1 | | 9/2001 |
| EP | 1 154 000 B1 | | 11/2001 |
| EP | 1 227 070 A1 | | 7/2002 |
| EP | 1 235 683 B1 | | 9/2002 |
| JP | 2 053298 | | 2/1990 |
| JP | 08026784 A | * | 1/1996 |
| JP | 2001106556 A | * | 4/2001 |
| JP | 2003-261323 | | 9/2003 |
| JP | 2003-277045 | | 10/2003 |
| JP | 2003-321218 | | 11/2003 |
| JP | 2004-124033 | | 4/2004 |
| JP | 2004-237250 | | 8/2004 |
| JP | 2004-277274 | | 10/2004 |
| WO | WO 83/03800 | | 11/1983 |
| WO | WO 95/06564 | | 3/1995 |
| WO | WO 96/28504 | | 9/1996 |
| WO | WO 98/28663 | | 7/1998 |
| WO | WO 00/01880 | | 1/2000 |
| WO | WO 01/94476 A2 | | 12/2001 |
| WO | WO02/18154 A1 | | 3/2002 |
| WO | WO 02/060988 A1 | | 8/2002 |
| WO | WO 03/009299 A2 | | 1/2003 |
| WO | WO 03/057478 A1 | | 7/2003 |
| WO | WO 2004/011271 A1 | | 2/2004 |
| WO | WO 2004/018197 A1 | | 3/2004 |
| WO | WO 2004/039607 A1 | | 5/2004 |
| WO | WO 2007/027861 A2 | | 3/2007 |
| WO | WO 2007/079160 A2 | | 7/2007 |

OTHER PUBLICATIONS

Flick, Ernest W. Plastics Additives Database. William Andrew Publishing/Plastics Design Library. Online version available at: http://www.knovel.com/knovel2/Toc.jsp?BookID=950&VerticalID=0.*
Petrie, Edward M. (2000). Handbook of Adhesives and Sealants . (pp. 253-278). McGraw-Hill. Online version available at: http://www.knovel.com/knovel2/Toc.jsp?BookID=610&VerticalID=0.*
STN search for gamm-aminopropyltriethoxysilane performed Aug. 7, 2008. Imported as STN.pdf.*
PCT International Search Report and Written Opinion for International Application No. PCT/US2007/015620 dated Apr. 11, 2008.

* cited by examiner

*Primary Examiner*—Mark Ruthkosky
*Assistant Examiner*—Gerard T Higgins
(74) *Attorney, Agent, or Firm*—Maria M. Koutakis; Kelly Law Registry

(57) ABSTRACT

The present invention provides certain laminates comprising a decorated poly(vinyl butyral) sheet and a film. Preferably, the film is a solar control film.

11 Claims, No Drawings

DECORATIVE POLYVINYL BUTYRAL SOLAR CONTROL LAMINATES

CROSS-REFERENCE TO RELATED APPLICATION

This application claims priority under 35 U.S.C. § 120 to U.S. Provisional Application No. 60/755,154, filed on Dec. 30, 2005, which is incorporated herein by reference in its entirety.

FIELD OF THE INVENTION

This invention relates to decorated polyvinyl butyral laminates that have solar control properties and to processes for producing such laminates.

BACKGROUND OF THE INVENTION

Several patents and publications are cited in this description in order to more fully describe the state of the art to which this invention pertains. The entire disclosure of each of these patents and publications is incorporated by reference herein.

Glass laminates are widely used in the automotive and construction industries. A prominent application is in safety glass for automobile windshields. Safety glass is characterized by high impact and penetration resistance and typically consists of a laminate of two glass sheets bonded together with an interlayer of a polymeric film or sheet. One or both of the glass sheets may be replaced with optically clear rigid polymeric sheets, such as sheets of polycarbonate materials. More complex safety glass laminates include constructions that include multiple layers of glass and polymeric sheets that are bonded together with interlayers of polymeric films or sheets.

A safety glass interlayer typically comprises a relatively thick polymer film or sheet that exhibits toughness and bondability and adheres to the glass in the event of a crack or impact. This prevents scatter of glass shards. Generally, the polymeric interlayer is characterized by a high degree of optical clarity and low haze. Resistance to impact, penetration and ultraviolet light is usually excellent. Other properties include long term thermal stability, excellent adhesion to glass and other rigid polymeric sheets, low ultraviolet light transmittance, low moisture absorption, high moisture resistance and excellent long term weatherability. Commonly used interlayer materials include multicomponent compositions based on polyvinyl butyral, polyurethane (PU), polyvinylchloride (PVC), linear low density polyethylenes prepared in the presence of metallocene catalysts, ethylene vinyl acetate (EVA), polymeric fatty acid polyamides, polyester resins, such as polyethylene terephthalate, silicone elastomers, epoxy resins, elastomeric polycarbonates, and the like.

A recent trend has been the use of glass laminated products known as architectural glass in the construction of homes and office structures. Newer products include those specifically designed to resist disasters. Some examples include hurricane resistant glass, theft resistant glazings and blast resistant glass laminated products. Certain of these products have strength sufficient to resist intrusion even if the glass laminate has been broken. Other products meet requirements for incorporation as structural elements within buildings, for example as glass staircases.

It is known to include some form of image or decoration within the laminated glass product. U.S. Pat. Nos. 3,973,058, 4,303,718, and 4,341,683 disclose a process for printing polyvinyl butyral sheet material, used as a component in laminated safety glass, with a solvent-based ink. Disclosures of tint bands are found for example, in U.S. Pat. Nos. 3,008,858; 3,346,526; 3,441,361; and 3,450,552; and in Japanese Patent 2053298.

Disclosures of decorative window films may be found, for example, in U.S. Pat. Nos. 5,049,433, 5,468,532, 5,505,801, and WO 83/03800 which disclose printed window films wherein the film may be affixed to a glass window.

Decorative glass laminates have been produced through the incorporation of decorated films. For example, U.S. Pat. No. 6,824,868, U.S. Patent Application Publication 2003/0203167 and PCT Publication WO 03/092999 disclose an interlayer for laminated glass comprising a polymeric support film with at least one printed color image, a polymeric film bonded to the support film, an adhesive layer bonded to the polymeric support film opposite of the interface between the polymeric support film and the polymeric film and another adhesive layer bonded to the polymeric film opposite of the interface between the polymeric film and the support film. These references teach that laminates of glass and decorated polyvinyl butyral layers would not have the integrity to be used in many applications due to low glass-to-interlayer adhesion. Other references disclosing laminates having printed layers include U.S. Patent Application Publication 2002/0119306, U.S. Patent Application Publication 2003/0091758, and European Patent 0 160 510. European Patent 1 129 844 discloses a composite stratified decorated glass and/or transparent plastic panel characterized in that it comprises first and second glass or transparent plastic panes and a film or sheet made from transparent plastic that bears a decoration. The decorated transparent film or sheet is placed between the two panes and is stably associated with the panes by means of layers of suitable adhesives applied to the panes by calendering or heat lamination. The adhesives include polyurethanes and polyvinyl butyrals. Coating primers, such as silane, polyurethane, epoxy, or acrylic primers may be used on the transparent plastic film. Manufacture of such embedded decorated film laminates is an inefficient method of production.

Decorative glass laminates derived from printed interlayers are known in the art. For example, U.S. Pat. No. 4,968,553, discloses an architectural glass laminate that includes an interlayer of extruded polyurethane, heat-laminated between two sheets of rigid material, wherein a non-solvent based ink containing solid pigments is printed on the polyurethane interlayer prior to lamination. This reference teaches away from the use of polyvinyl butyral as an interlayer material, but decorative polyvinyl butyral sheets produced by transfer processes and used for glass laminates are known. For example, U.S. Pat. Nos. 4,173,672, 4,976,805, 5,364,479, 5,487,939, and 6,235,140 disclose a method for manufacture of decorated colored glass involving transfer of a color impression onto an adhesive polyvinyl butyral layer. Ink jet printing a temporary substrate and transfer printing the image onto a second substrate is disclosed in WO 95/06564 and WO 2004/039607.

Decorative printed polyvinyl butyral sheets for glass laminates are also known in the art. U.S. Pat. No. 5,914,178 discloses a laminated pane which comprises at least one visible motif, the pane comprising at least one rigid sheet of a glass material or a plastics material and at least one sheet of flexible plastics material. The motif is at least partly formed of at least one coating of organic ink epoxy layer. The reference discloses that polyvinyl butyral and polyurethane plastics materials may be utilized.

U.S. Patent Application Publication 2004/0187732 discloses an ink jet ink set comprising non-aqueous, colored, pigmented inks, at least one of which is a yellow ink comprising PY120 dispersed in a non-aqueous vehicle. The use of this ink set in ink jet printing of, for example, polyvinyl butyral substrates is disclosed, as is the use of the printed substrate in preparation of laminated glass articles. U.S. Patent Application Publication 2004/0234735 and WO 02/18154 disclose a method of producing image carrying laminated material including the steps of forming an image on a first surface of a sheet of interlayer using solvent based ink, paint or dye systems, interposing the interlayer sheet between two sheets of material and joining the two sheets of material to form the laminate by activating the interlayer. WO 2004/011271 discloses a process for ink-jet printing an image onto a rigid thermoplastic interlayer, wherein the interlayer has a Storage Young's Modulus of 50-1,000 MPa. WO 2004/018197 discloses a process for obtaining an image-bearing laminate having a laminate adhesive strength of at least 1000 psi, which includes ink jet printing a digital image onto a thermoplastic interlayer selected from polyvinyl butyrals, polyurethanes, polyethylenes, polypropylenes, polyesters, and EVA using a pigmented ink which comprises at least one pigment selected from the group consisting of PY120, PY155, PY128, PY180, PY95, PY93, PV19/PR202, PR122, PR15:4, PB15:3, and PBI7.

Reduction of energy consumption within structures in which glass is applied is very desirable and has led to development of solar control glass structures. Typical solar control glass is designed to eliminate or reduce energy from the near infrared region of the electromagnetic spectrum. For example, the air conditioning load may be reduced in buildings equipped with solar control windows which block out a portion of the near infrared region of the solar spectral range. Solar control glass laminates may be obtained by modification of the glass itself, by modification of polymeric interlayers used in laminated glass, and by the addition of further solar control layers, such as in window films. Metal oxide nanoparticles are often used in solar control layers to absorb infrared light and convert energy to heat. Materials having nominal particle sizes below about 50 nanometers are used to preserve the clarity and transparency of the substrate. Infrared-absorbing nanoparticles of commercial significance are antimony tin oxide and indium tin oxide. Processes to produce antimony tin oxide particles and indium tin oxide particles are disclosed in U.S. Pat. Nos. 4,478,812; 4,937,148; 5,075,090; 5,376,308; 5,772,924; 5,807,511; 5,518,810; 5,622,750; 5,958,631; 6,051,166 and 6,533,966.

Antimony tin oxide nanoparticles and indium tin oxide nanoparticles have been incorporated into polymeric interlayers of glass laminates. Laminated glass which incorporates homogeneously dispersed, functional, ultra-fine particles is disclosed in U.S. Pat. Nos. 5,830,568; 6,315,848; 6,329,061; and 6,579,608. Laminated glass that includes indium tin oxide particles dispersed within plasticized polyvinyl butyral interlayers and certain types of glass is disclosed in U.S. Pat. Nos. 6,506,487 and 6,686,032. U.S. Pat. No. 6,632,274 discloses ultrafine particle dispersions in a plasticizer and their use in polyvinyl butyral interlayers for glass laminates. U.S. Pat. Nos. 6,620,477, 6,632,274 and 6,673,456 disclose laminated glass that contains indium tin oxide particles dispersed within certain plasticized polyvinyl butyral interlayers. U.S. Pat. No. 6,733,872 discloses sound proofed glass laminates which include indium tin oxide particles dispersed within plasticized polyvinyl butyral interlayers. European Patent Application 1 227 070 A1 discloses an interlayer for laminated glass comprising an adhesive resin.

Antimony tin oxide and indium tin oxide nanoparticles have also been incorporated into coatings. Particle dispersions, coating solutions, and coated substrates of these substances are disclosed in U.S. Pat. Nos. 5,376,308; 5,504,133; 5,518,810; 5,654,090; 5,662,962; 5,742,118; 5,763,091; 5,772,924; 5,807,511; 5,830,568; 6,084,007; 6,191,884; 6,221,945; 6,261,684; 6,277,187; 6,315,848; 6,319,613; 6,329,061; 6,404,543; 6,416,818; 6,506,487; 6,528,156; 6,579,608; 6,620,477; 6,632,274; 6,663,950; 6,673,456; 6,686,032; 6,733,872; European Patent 947 566; and European Patent Application 1 154 000 A1. For example, U.S. Pat. No. 5,807,511 discloses a near infrared screening filter composition which includes a metal oxide or inorganic oxide powder and a dye. Japanese Patent Publication 2004124033 discloses a coating material which includes electrically conductive transparent ultrafine particles and a polyester substrate coated with the material that produces an infrared-shielding film.

Film substrates coated with antimony tin oxide and indium tin oxide materials have been disclosed as solar control window coverings. U.S. Pat. No. 5,518,810, discloses the use of indium tin oxide and antimony tin oxide particles in infrared ray cutoff coatings. U.S. Pat. Nos. 6,191,884, 6,261,684 and 6,528,156 disclose coatings that contain indium tin oxide particles useful as solar control window films. The films may be attached to windows with a thin layer of contact adhesive.

Metal boride nanoparticles have also been utilized to absorb infrared light and convert energy to heat. To preserve the clarity and transparency of the substrate these materials have nominal particle sizes below about 200 nanometers (nm). Metal boride nanoparticles are reported to be more efficient than metal oxide nanoparticles, resulting in the use of significantly reduced levels of the former to attain equivalent performance. Infrared-absorbing metal boride nanoparticles include lanthanum hexaboride. These materials may be produced as disclosed in Japanese Patent Publications 2004277274; 2004237250; 2003321218; 2003277045; and 2003261323. U.S. Pat. No. 6,060,154 discloses a coating solution that contains lanthanum hexaboride nanoparticles and solar control films produced therefrom. U.S. Pat. Nos. 6,221,945 and 6,277,187 disclose a coating solution containing lanthanum hexaboride nanoparticles and solar control films produced by coating the nanoparticles onto a substrate. U.S. Pat. No. 6,319,613 and European Patent 1 008 564 disclose coating solutions containing a combination of lanthanum hexaboride and antimony tin oxide or indium tin oxide nanoparticles for use in solar control window covering films. U.S. Pat. No. 6,663,950 discloses solar control window films comprising a transparent polymeric film substrate having a UV-absorbing material coated with a hardcoat layer. Polymeric dispersions of lanthanum hexaboride nanoparticles are disclosed in U.S. Pat. No. 6,673,456. WO 02/060988 discloses glass laminates prepared from polyvinyl butyral resin containing lanthanum hexaboride or a mixture of lanthanum hexaboride and indium tin oxide or antimony tin oxide. Master batch compositions containing lanthanum hexaboride nanoparticles in a thermoplastic resin are disclosed in U.S. Published Patent Application 2004/0028920.

A shortcoming of solar control laminates which incorporate infrared absorptive materials is that a significant proportion of the light absorbed serves to generate heat. This is especially true when the laminates are used in structures such as parking garages. In such situations, reflective solar control laminates are desirable because they do not increase in temperature by absorbing solar energy.

Metallized substrate films have been used in solar control laminates. These include polyester films which have electrically conductive metal layers, such as aluminum or silver metal, typically applied through a vacuum deposition or a sputtering process. These structures and their use in glass laminates is disclosed in U.S. Pat. Nos. 3,718,535; 3,816,201; 3,962,488; 4,017,661; 4,166,876; 4,226,910; 4,234,654; 4,368,945; 4,386,130; 4,450,201; 4,465,736; 4,782,216; 4,786,783; 4,799,745; 4,973,511; 4,976,503; 5,024,895; 5,069,734; 5,071,206; 5,073,450; 5,091,258; 5,189,551; 5,264,286; 5,306,547; 5,932,329; 6,391,400 and 6,455,141. U.S. Pat. Nos. 4,782,216 and 4,786,783 disclose a transparent, laminated window with near IR rejection that includes two transparent conductive metal layers. U.S. Pat. No. 4,973,511 discloses a laminated solar window construction which includes a PET sheet with a multilayer solar coating. U.S. Pat. No. 4,976,503 discloses an optical element that includes light-reflecting metal layers. Reflecting interference films are disclosed in U.S. Pat. No. 5,071,206. U.S. Pat. No. 5,091,258 discloses a laminate that incorporates an infra-red radiation reflecting interlayer. A laminated glass pane having a transparent support film of tear-resistant polymer provided with an IR-reflecting coating and two adhesive layers is disclosed in U.S. Pat. No. 5,932,329. U.S. Pat. No. 6,204,480 discloses thin film conductive sheets for windows while U.S. Pat. No. 6,391,400 discloses dielectric layer interference effect thermal control glazings for windows. U.S. Pat. No. 6,455,141 discloses laminated glass that incorporates an interlayer having an energy-reflective coating. European Patent 0 418 123 discloses laminated glass with an interlayer comprising a copolymer of vinyl chloride and glycidyl methacrylate.

Heretofore it has not been known to combine the benefits of decorative glass laminates with the benefits of solar control glass laminates.

SUMMARY OF THE INVENTION

The present invention is directed to a laminate comprising a layer of a decorated polymer sheet and a layer of a film. In particular, the present invention relates to a laminate comprising a polymer sheet having upper and lower surfaces, said sheet having a thickness of at least about 0.25 mm, wherein at least a portion of at least one of said surfaces consists essentially of an image disposed thereupon the polymer surface, and wherein said polymer sheet comprises polyvinyl butyral.

The present invention is also directed to a laminate comprising a layer of a decorated polymer sheet and a layer of a solar control film. In particular, the present invention is a laminate comprising (1) a polymer sheet having upper and lower surfaces, said sheet having a thickness of at least about 0.25 mm, wherein at least a portion of at least one of said surfaces consists essentially of an image disposed thereupon the polymer surface, and wherein said polymer sheet comprises polyvinyl butyral, and (2) at least one layer of a solar control film.

The present invention is also directed to a process for preparing an image bearing laminate, the process comprising the steps of: (1) creating an image-bearing surface on a polymer sheet having upper and lower surfaces by applying an image to at least a portion of at least one surface of the polymer sheet, wherein said sheet has a thickness of at least about 0.25 mm, and wherein said polymer sheet comprises polyvinyl butyral; (2) laminating the image-bearing surface to another layer.

DETAILED DESCRIPTION OF THE INVENTION

The definitions herein apply to the terms as used throughout this specification, unless otherwise limited in specific instances.

The term "modulus" as used herein, refers to a modulus that is measured in accord with ASTM Standard D 638-03.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and other factors that will be apparent to those of skill in the art. In general, an amount, size, formulation, parameter or other quantity or characteristic is "about" or "approximate" whether or not expressly stated to be such.

The term "or", when used alone herein, is inclusive; more specifically, the phrase "A or B" means "A, B, or both A and B". Exclusive "or" is designated herein by terms such as "either A or B" and "one of A or B", for example.

When materials, methods, or machinery are described herein with the term "known to those of skill in the art", or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

All percentages, parts, ratios, and the like set forth herein are by weight, unless otherwise limited in specific instances.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

The decorated sheet layer of the laminate of the present invention comprises a polyvinyl butyral polymer. The polyvinyl butyral will typically have a weight average molecular weight range of from about 30,000 to about 600,000 Daltons, preferably of from about 45,000 to about 300,000 Daltons, more preferably from about 200,000 to 300,000 Daltons, as measured by size exclusion chromatography using low angle laser light scattering. The preferable polyvinyl butyral comprises, on a weight basis, about 5 to about 30 percent, preferably about 11 to about 25 percent, and more preferably about 15 to about 22 percent of hydroxyl groups calculated as polyvinyl alcohol (PVOH). In addition, the preferable polyvinyl butyral will incorporate up to about 10 percent, preferably up to about 3 percent residual ester groups, calculated as polyvinyl ester, typically acetate groups, with the balance being butyraldehyde acetal. The polyvinyl butyral may incorporate a minor amount of acetal groups other than butyral, for example, 2-ethylhexanal, as disclosed in U.S. Pat. No. 5,137,954.

Polyvinyl butyral resin may be produced by aqueous or solvent acetalization. Solvent acetalization processes typically are conducted in the presence of sufficient solvent to permit dissolution of the polyvinyl butyral formed and to produce a homogeneous solution at the conclusion of the acetalization. The polyvinyl butyral is isolated by precipitation of solid particulate product with water. The polymer product is then washed and dried. Common solvents include lower aliphatic alcohols, such as ethanol. In aqueous processes acetalization is carried out by adding butyraldehyde to a water solution of polyvinyl alcohol at a temperature of approximately 20° C. to about 100° C. in the presence of an acid catalyst, agitating the mixture to cause an intermediate polyvinyl butyral to precipitate in finely divided form and continuing the agitation while heating until the reaction mixture has proceeded to the desired end point, followed by neutralization of the catalyst, separation, stabilization and drying of the polyvinyl butyral resin.

Preferably, the polyvinyl butyral will contain a plasticizer. The amount used will depend on the specific polyvinyl butyral resin and the properties desired. Useful plasticizers are disclosed in U.S. Pat. Nos. 3,841,890; 4,144,217; 4,276,351; 4,335,036; 4,902,464; 5,013,779 and PCT Publication WO 96/28504. Plasticizers commonly employed are esters of polybasic acids or polyhydric alcohols. Particularly suitable plasticizers are triethylene glycol di-(2-ethyl butyrate), triethylene glycol di-2-ethylhexanoate, triethylene glycol di-n-heptanoate, oligoethylene glycol di-2-ethylhexanoate, tetraethylene glycol di-n-heptanoate, dihexyl adipate, dioctyl adipate, mixtures of heptyl and nonyl adipates, dibutyl sebacate, tributoxyethylphosphate, isodecylphenylphosphate, triisopropylphosphite, polymeric plasticizers such as the oil-modified sebacid alkyds, and mixtures of phosphates and adipates, and adipates and alkyl benzyl phthalates. Generally between about 15 to about 80 parts of plasticizer per hundred parts of polyvinyl butyral, preferably about 25 to about 45 parts of plasticizer per hundred parts of polyvinyl butyral are used. This latter concentration is generally utilized in combination with polyvinyl butyral resins containing 17 to 25 percent vinyl alcohol by weight.

An adhesion control additive may be added for purposes of controlling the adhesive bond between the polyvinyl butyral and for example, a rigid glass layer. Such additives are generally alkali metal or alkaline earth metal salts of organic and inorganic acids. Preferably, they are alkali metal or alkaline earth metal salts of organic carboxylic acids having from 2 to 16 carbon atoms. More preferably, they are magnesium or potassium salts of organic carboxylic acids having from 2 to 16 carbon atoms. Specific examples of useful adhesion control additives include potassium acetate, potassium formate, potassium propanoate, potassium butanoate, potassium pentanoate, potassium hexanoate, potassium 2-ethylbutylate, potassium heptanoate, potassium octanoate, potassium 2-ethylhexanoate, magnesium acetate, magnesium formate, magnesium propanoate, magnesium butanoate, magnesium pentanoate, magnesium hexanoate, magnesium 2-ethylbutylate, magnesium heptanoate, magnesium octanoate, magnesium 2-ethylhexanoate and the like, including mixtures. The adhesion control additive will typically be present in an amount of about 0.001 to about 0.5 weight percent, based on the total weight of the polyvinyl butyral sheet composition.

It is understood that the polyvinyl butyral polymers may incorporate various additives known within the art. Such additives include antioxidants, ultraviolet absorbers, ultraviolet stabilizers, thermal stabilizers, colorants and the like, such as described in U.S. Pat. No. 5,190,826. Other additives may include processing aids, flow enhancing additives, lubricants, pigments, dyes, flame retardants, impact modifiers, nucleating agents to increase crystallinity, antiblocking agents such as silica, thermal stabilizers, dispersants, surfactants, chelating agents, coupling agents, adhesives, primers and the like. The amount of a particular additive used will depend upon the type of additive and the particular polyvinyl butyral polymer. For example, a UV stabilizer level could be used at levels as low as 0.1 weight percent based on the total weight of the sheet composition, while a plasticizer might be used at a level of more than 30 weight percent based on the total weight of the sheet composition. Methods for selecting and optimizing the particular levels and types of additives for the polymers comprising the sheet material are known to those skilled in the art.

Colorants are sometimes added to provide pigmentation or to control amount of transmitted solar light. Typical colorants may include a bluing agent to reduce yellowing.

Any known thermal stabilizer or mixture of thermal stabilizers will find utility within the present invention. Useful thermal stabilizers include phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and the like Generally, when used, thermal stabilizers will be present in the polymer that forms the sheet in an amount of 0.001 to 10 weight percent based on the total weight of the polyvinyl butyral composition. Preferably, 0.001 to about 5.0 weight percent thermal stabilizers, based on the total weight of the polyvinyl butyral composition will be used. More preferably 0.05 to about 1.0 weight percent thermal stabilizers, based on the total weight of the polyvinyl butyral composition will be used.

The polyvinyl butyral may contain a UV absorber or a mixture of UV absorbers. Preferable general classes of UV absorbers include benzotriazoles, hydroxybenzophenones, hydroxyphenyl triazines, esters of substituted and unsubstituted benzoic acids, and the like and mixtures thereof. Any UV absorber known within the art will find utility within the present invention. The polyvinyl butyral compositions useful in the present invention preferably incorporate from about 0.001 to about 10.0 weight percent UV absorbers, based on the total weight of the polyvinyl butyral composition, more preferably 0.001 to 5.0 weight percent, based on the total weight of the polyvinyl butyral composition and most preferably, 0.05 to 1.0 weight percent based on the total weight of the polyvinyl butyral composition.

The polyvinyl butyral composition may also incorporate an effective amount of a hindered amine light stabilizers (HALS). Generally, HALS are understood to be secondary, tertiary, acetylated, N-hydrocarbyloxy substituted, hydroxy substituted N-hydrocarbyloxy substituted, or other substituted cyclic amines which further have some degree of steric hindrance, generally derived from aliphatic substitution on the carbon atoms adjacent to the amine function. When used, HALS are preferably present in amounts of from 0.001 to 10.0 weight percent, based on the total weight of the polyvinyl butyral composition, more preferably from 0.05 to 5.0 weight percent based on the total weight of the polyvinyl butyral composition, most preferably from 0.05 to 1.0 weight percent based on the total weight of the polyvinyl butyral composition.

The polyvinyl butyral sheet has a thickness of greater than about 0.25 mm (10 mils) to provide penetration resistance of the resulting laminate. Preferably, the polymeric sheet has a thickness of about 0.38 mm (15 mils) or greater to provide enhanced penetration resistance. More preferably, the polymeric sheet has a thickness of about 0.75 mm (30 mils) or greater to provide even greater enhanced penetration. The laminates of the invention may comprise several layers (also known as plies). Preferably, the total thickness of all polymeric sheet layers (that is, all of the polymeric sheet layers incorporated within a particular laminate), will be about 0.75 mm (30 mils) or greater to ensure adequate penetration resistance.

Polyvinyl butyral sheets useful in the laminates of the invention may be formed by any process known in the art, such as extrusion, calendering, solution casting or injection molding. The parameters for each of these processes can be easily determined by one of ordinary skill in the art depending upon viscosity characteristics of the polymeric material and the desired thickness of the sheet. The sheet of the present invention is preferably formed by extrusion. Extrusion is particularly preferred for formation of "endless" products, such as films and sheets. In extrusion, the polyvinyl butyral, whether provided as a molten polymer or as plastic pellets or granules, is fluidized and homogenized. In extrusion processes, which are typically conducted at melt temperatures of 50° C. to about 300° C., the polymeric material is fluidized and homogenized. Preferably, the melt processing temperature is from about 100° C. to about 250° C. Recycled polymeric compositions may be used along with the virgin polymeric compositions. The polymer composition is forced through a suitably shaped die to produce the desired cross-sectional sheet shape. Sheets of different widths and thickness may be produced through use of appropriate dies, for example slot dies or circular dies. Using extruders known in the art a sheet can be produced by extruding a layer of polymer over chilled rolls and then further drawing down the sheet to the desired size by means of tension rolls.

Plasticized polyvinyl butyral sheet may be formed by initially mixing polyvinyl butyral resin with plasticizer and optionally other additives, and then extruding the formulation through a sheet-shaping die, i.e. forcing molten, plasticized polyvinyl butyral through a horizontally long, vertically narrow die opening substantially conforming in length and width to that of the sheet being formed. The polymeric sheet useful in the laminates of the present invention may have a smooth surface, but preferably it will have a roughened surface to permit most of the air between layers to be removed during lamination processes. Surface roughening may be accomplished, for example, by mechanically embossing the sheet after extrusion or by melt fracture during extrusion of the sheet and the like. Rough surfaces on one or both sides of the extruding sheet are provided by the design of the die opening and the temperature of the die exit surfaces through which the extrudate passes. Alternative techniques for producing a rough surface on extruded polyvinyl butyral sheet involve the control of one or more of polymer molecular weight distribution, water content and melt temperature. Alternatively, the extruded sheet may be passed over a specially prepared surface of a die roll positioned in close proximity to the exit of the die which imparts the desired surface characteristics to one side of the molten polymer. Thus, when the surface of such a die roll has minute peaks and valleys, it will produce a rough surface on the side of the sheet which contacts the roll. Such die rolls are disclosed in U.S. Pat. No. 4,035,549. This rough surface is only temporary and particularly functions to facilitate deairing during laminating, after which it is melted smooth from the elevated temperature and pressure associated with autoclaving and other lamination processes.

The frequency of the roughened surface of the sheet is important to the quality of the image that is disposed on the polymer sheet. The frequency can be calculated using data from profilometer data. Preferably the frequency is above about 0.90 cycles/mm, more preferably, in the range of from about 0.90 cycles/mm to about 3 cycles/mm, most preferably in the range of from about 1.1 cycles/mm to about 2.5 cycles/mm. Beyond the upper limit significant improvement in the image quality may not be observed. Below the lower limit, the image quality may be poor.

A sheeting calender is employed for manufacture of large quantities of sheets. If the sheet is required to have a textured surface, an appropriate embossing pattern may be applied through use of an embossing roller or an embossing calender.

In addition, the sheet may be treated by radiation, for example by electron beam treatment of the films and sheets. Such treatment with radiation in an intensity in the range of about 2 MRd to about 20 MRd will provide an increase in the softening point sheet. Preferably, the radiation intensity is from about 2.5 MRd to about 15 MRd.

The polyvinyl butyral sheet will have at least one image disposed on at least one surface, i.e. on the upper or lower surface of the sheet. Images may also be disposed on both the upper and lower surfaces of the sheet. The images may completely cover the sheet or they may be disposed on a small portion of the sheet. Depending on the method of application of the image, the percent coverage of the sheet may be above 100 percent. That is, the coverage of the image is determined by the number of inks utilized within a particular ink set. This can include application by multistrikes on the same area. Generally this provides for up to 100 percent coverage on the polymeric sheet for each ink used within a certain ink set. Thus, for example, if application of the image takes place using an inkjet printer and the ink set includes three inks, up to 300 percent coverage is possible. The term "percent coverage", as used herein, is not to be confused with the percentage of the surface that is occupied by the image. For example, an image may occupy essentially 100% of the sheet's surface, but the percent coverage may be 10%, as for a translucent display or the like. Alternatively, an image may occupy 10% of the sheet's surface, but the percent coverage of the image may be 300%, as for a small design with saturated colors. Preferably, the image is disposed on at least ten percent of the surface of at least one of said surfaces of said sheet. Also preferably, the image has a percent coverage of at least ten percent. One of ordinary skill in the art of inkjet printing would know how to determine the appropriate coverage for a given decorated sheet.

The image may be applied to the sheet by any known art method. Such methods may include, for example; air-knife, printing, painting, Dahlgren, flexo, gravure, spraying, thermal transfer print printing, silk screen, thermal transfer, inkjet printing or other art processes. The image may be, for example, a symbol, geometric pattern, photograph, alphanumeric character, and the like or a layer of ink. In addition, combinations of such images may be utilized.

Preferably, the image is applied to the sheet by a digital printing process. A major advantage of digital printing is the minimal setup times required to produce an image. Such processes provide speed and flexibility. Examples of digital printing processes include, for example, thermal transfer printing and inkjet printing.

Thermal transfer printing, which is a dry-imaging process that involves the use of a printhead containing many resistive heating elements that selectively transfer solid ink from a coated ribbon to a substrate, is often used in applications such as printing bar codes onto labels and tags.

More preferably, the image is applied to the polymer sheet through an ink jet printing process. Ink jet printing is used in applications including desktop publishing and digital photography. It is also suitable for printing on textiles and fabrics. Ink jet printing is typically a wet-imaging, non-contact process in which a vehicle or carrier fluid is energized to "jet" ink components from a printhead over a small distance onto a substrate. Ink jet technologies include continuous and drop-on-demand types, with the drop-on-demand printing being the most common. Ink jet printheads generally fall within two broad categories: thermal printheads, mainly used with aqueous inks, and piezo-electric printheads, mainly used with solvent inks. In one particularly useful embodiment, the image is printed onto the polymer sheet using a piezo-electric drop-on-demand digital printing process.

The type of ink used in ink jet application of the image to the polymer sheet is not critical. Any of the common ink jet type inks are suitable. The ink may be solvent based, often referred to in the art as a "non-aqueous vehicle", which term refers to a vehicle that substantially comprises a non-aqueous solvent or mixtures of such solvents. Such inks may comprise a colorant that is dissolved, e.g., a dye. Solvents may be polar and/or nonpolar. Examples of polar solvents include, for example, alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene, and triethylene glycols. Useful, but less preferred, polar solvents include, for example, methyl isobutyl ketone, methyl ethyl ketone, butyrolactone and cyclohexanone. Examples of non-polar solvents include, for example, aliphatic and aromatic hydrocarbons having at least six carbon atoms and mixtures of such materials, including refinery distillation products and byproducts. Adventitious water may be carried into the ink formulation, generally at levels of no more than about 2-4 percent by weight. By definition, a non-aqueous ink will have no more than about 10 weight percent, and preferably no more than about 5 weight percent, of water based on the total weight of the non-aqueous vehicle.

The ink may also be aqueous or water based. An aqueous ink may comprise a colorant that is dispersed, e.g., a pigment. Combinations of solvent and water based inks are also useful. In addition to the colorant, an ink jet ink formulation may contain humectants, surfactants, biocides, and penetrants and other ingredients known to those skilled in the art.

The amount of the vehicle in the ink is typically in the range of about 70 weight percent to about 99.8 weight percent, and preferably about 80 weight percent to about 99.8 weight percent, based on the total weight of the ink.

Preferably, the ink incorporates pigments. Pigment colorants have enhanced color fastness compared to dyes. They also exhibit excellent thermal stability, edge definition, and low diffusivity on the printed substrate. Preferably, however, solvent based ink is used as the ink jet ink due to the difference in dispersion properties. Standards of dispersion quality are high in ink jet printing processes. While pigments having a certain particle size may be "well dispersed" for certain applications, the same level of dispersion may be inadequate for ink jet applications.

Preferably, the ink jet inks form a set that comprises at least three different, non-aqueous, colored pigmented inks (CMY), at least one of which is a magenta ink, at least one of which is a cyan ink, and at least one of which is a yellow ink dispersed in a non-aqueous vehicle. The yellow pigment preferably is chosen from the group consisting of Color Index PY120, PY155, PY128, PY180, PY95, PY93 and mixtures thereof. More preferably, the yellow pigment is Color Index PY120. A commercial example is PV Fast Yellow H2G (Clariant). This pigment has the advantageous color properties of favorable hue angle, good chroma, and light fastness and further disperses well in non-aqueous vehicle. Most preferably, the magenta ink comprises a complex of PV19 and PR202 (also referred to as PV19/PR202) dispersed in a non-aqueous vehicle. A commercial example is Cinquasia Magenta RT-255-D (Ciba Specialty Chemicals Corporation). The pigment particles can comprise an intimate complex of the PV19 and PR202 species, not simply a physical mixture of the individual PV19 and PR202 crystals. This pigment has the advantageous color properties of quinacridone pigments such as PR122 with favorable hue angle, good chroma, and light fastness and further disperses well in non-aqueous vehicle. In contrast, PR122 pigment does not disperse well under similar conditions. Also preferred is a cyan ink comprising PB 15:3 and/or PB 15:4 dispersed in a non-aqueous vehicle. Other preferable pigments include, for example, PR122 and PBl7. The ink set will commonly additionally include a non-aqueous, pigmented black ink, comprising a carbon black pigment. Preferably, the ink set comprises at least four inks (CMYK). The ink set may comprise a greater number of inks. For example, mixtures of six inks and eight inks are common.

Additional pigments for ink jet applications are generally well known. A representative selection of such pigments are found, for example, in U.S. Pat. Nos. 5,026,427; 5,086,698; 5,141,556; 5,169,436 and 6,160,370. The exact choice of pigment will depend upon color reproduction and print quality requirements of the application.

Generally, pigments are stabilized in a dispersion by employing dispersing agents, such as polymeric dispersants or surfactants. "Self-dispersible" or "self-dispersing" pigments ("SDP(s)") have been developed that are dispersible in a vehicle without added dispersants. The dispersant can be a random or structured polymeric dispersant. Random polymers include acrylic polymers and styrene-acrylic polymers. Structured dispersants include AB, BAB and ABC block copolymers, branched polymers and graft polymers. Useful structured polymers are disclosed in, for example, U.S. Pat. Nos. 5,085,698 and 5,231,131 and in European Patent Application 0556649. Examples of typical dispersants for non-aqueous pigment dispersions include those sold under the trade names: Disperbyk (BYK-Chemie, USA), Solsperse (Avecia) and EFKA (EFKA Chemicals) polymeric dispersants. SDPs for non-aqueous inks include, for example, those described in U.S. Pat. No. 5,698,016; U.S. Published Patent Applications 2001003263; 2001004871 and 20020056403 and PCT Publication WO 01/94476.

It is desirable to use small pigment particles for maximum color strength and good jetting of ink. The particle size is generally be in the range of from about 0.005 micron to about 15 microns, preferably in the range of about 0.01 to about 0.3 micron. The levels of pigment employed in the inks are typically in the range of from about 0.01 to about 10 weight percent, based on the total weight of the ink. The level of pigment employed in the inks are typically in the range of from about 0.01 to about 10 weight percent, based on the total weight of the ink.

The solvent or aqueous inks may optionally contain one or more other ingredients such as surfactants, binders, bactericides, fungicides, algicides, sequestering agents, buffering agents, corrosion inhibitors, light stabilizers, anti-curl agents, thickeners, and/or other additives and adjuvants well know within the relevant art. The requirements of a particular ink jet printer to provide an appropriate balance of properties such as, for example, viscosity and surface tension, and/or may be used to improve various properties or functions of the inks as needed. The amount of each ingredient is typically below about 15 weight percent and more typically below about 10 weight percent, based on the total weight of the ink.

Useful surfactants include ethoxylated acetylene diols (e.g. Surfynols® series from Air Products), ethoxylated primary (e.g. Neodol® series from Shell) and secondary (e.g. Terigitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically utilized in amounts of about 0.01 to about 5 weight percent, preferably in amounts of about 0.2 to about 2 weight percent, based on the total weight of the ink. Useful types of binders are soluble or dispersed polymer(s) added to the ink to improve the adhesion of a pigment. Examples include polyesters, polystyrene/acrylates, sulfonated polyesters, polyurethanes, polyimides, polyvinyl pyrrolidone/vinyl acetate (PVPNA), polyvinyl pyrrolidone (PVP) and mixtures thereof. Binders are generally used at levels of at least about 0.3 weight percent, preferably at least about 0.6 weight percent based on the total weight of the ink. Upper limits are dictated by ink viscosity or other physical limitations.

Non-aqueous vehicles may also be comprised entirely or in part of polymerizable solvents, such as solvents which cure upon application of actinic radiation (actinic radiation curable) or UV light (UV curable). Specific examples of the radically polymerizable monomers and oligomers which may serve as components within such reactive solvent systems include, for example; vinyl monomers (meth)acrylate esters, styrene, vinyltoluene, chlorostyrene, vinyl acetate, allyl alcohol, maleic acid, maleic anhydride, maleimide, N-methylmaleimide (meth)acrylic acid, itaconic acid, ethylene oxide-modified bisphenol A, mono(2-(meth)acryloyloxyethyl) acid phosphate, phosphazene (meth)acrylate compounds, urethane (meth)acrylate compounds, prepolymers having at least one (meth)acryloyl group, polyester (meth)acrylates, polyurethane (meth)acrylates, epoxy(meth)acrylates, polyether (meth)acrylates, oligo(meth)acrylates, alkyd (meth)acrylates, polyol (meth)acrylates, silicone (meth)acrylates, tris[(meth)acryloyloxyethyl]isocyanurate, saturated or unsaturated mixed polyester compounds of (meth)acrylic acid having one, two or more (meth)acryloyloxy groups in a molecule and the like and mixtures thereof.

Actinic radiation-curable compositions generally contain a minor amount of a photoinitiator. Specific examples include 1-hydroxycyclohexyl phenyl ketone, benzophenone, benzyl dimethylketal, benzoin methyl ether, benzoin ethyl ether, p-chlorobenzophenone, 4-benzoyl-4-methyldiphenyl sulfide, 2-benzyl-2-dimethylamino-1-(4-morpholino-phenyl)butanone-1,2-methyl-1-4-(methylthio)phenyl-2-morpholinopropanone-1, diethoxy acetophenone, and others. Photo-cationic polymerization initiators may also be employed. One or more photoinitiators may be added at a total level of from about 0.1 weight percent to about 20 weight percent based on the weight of total ink composition. Preferably from about 0.1 weight percent to about 15.0 weight percent of the photoinitiator is used based on the total weight of the ink composition.

Alternatively, the image may be formed from a photo-cationic-curable material. Generally, photo-cationically-curable materials incorporate epoxide and/or vinyl ether materials. The compositions may optionally include reactive diluents and solvents. Specific examples of preferable optional reactive diluents and solvents include epoxide-containing and vinyl ether-containing materials, for example; bis(2,3-epoxycyclopentyl)ether, 2,3-epoxy cyclopentyl glycidyl ether, 1,2-bis(2,3-epoxycyclopentyloxy)ethane, bis(4-hydroxycyclohexyl)methane diglycidyl ether and others. Any type of photoinitiator that forms cations that initiate the reactions of the epoxy and/or vinyl ether material(s) on exposure to actinic radiation can be used. There are a large number of known cationic photoinitiators for epoxy and vinyl ether resins within the art that are suitable. They include, for example, onium salts, onium salts with anions of weak nucleophilicity, halonium salts, iodosyl salts or sulfonium salts, such as are disclosed in EP 153904 and WO 98/28663, sulfoxonium salts, such as disclosed, for example, in EP 35969, EP 44274, EP 54509, and EP 164314, or diazonium salts, such as disclosed, for example, in U.S. Pat. Nos. 3,708,296 and 5,002,856. Other cationic photoinitiators are metallocene salts, such as disclosed, for example, in EP 94914 and EP 94915. A survey of other current onium salt initiators and/or metallocene salts can be found in "UV Curing, Science and Technology" (Editor S. P. Pappas, Technology Marketing Corp., 642 Westover Road, Stamford, Conn., U.S.A.) or "Chemistry & Technology of UV & EB Formulation for Coatings, Inks & Paints", Vol. 3 (edited by P. K. T. Oldring). Specific examples of photo-cationic initiators include, for example; mixed triarylsulfonium hexafluoroantimonate salts (Cyracure® UVI-6974 and Cyracure® UVI-6990 photo-cationic initiators, available from the Union Carbide Company), diaryliodonium salts, such as the tetrafluoroborate, hexafulorophosphate, hexafluoroarsenate and hexafluoroantimonate salts, diphenyliodonium hexafluoroantimonate, triaryl sulfonium salts, such as tetrafluoroborate, hexafluorophosphate, hexafluoroarsenate and hexafluoroantimonate salts of triphenylsulfonium, 4-tertiarybutyltriphenylsulfonium, tris(4-methylphenyl)sulfonium, tris(4-methoxyphenyl)sulfonium, and 4-thiophenyltriphenylsulfonium, triphenylsulfonium hexafluorophosphate and the like and mixtures thereof.

When the ink contains a component that cures upon application of actinic radiation (actinic radiation curable) or UV light (UV curable), the polymer sheet bearing the applied image is irradiated with actinic radiation (UV light or an electron beam) to cure the image on the polymeric sheet. The source of actinic radiation may be selected from for example a low-pressure mercury lamp, high-pressure mercury lamp, metal halide lamp, xenon lamp, excimer laser, and dye laser for UV light, an electron beam accelerator and the like. The dose is usually in the range of 50-3,000 mJ/cm$^2$ for UV light and in the range of 0.2-1,000 mu C/cm$^2$ for electron beams.

Jet velocity, drop size and stability are greatly affected by the surface tension and the viscosity of the ink. Inkjet inks typically have a surface tension in the range of about 20 dyne/cm to about 60 dyne/cm at 25° C. Viscosity can be as high as 30 cP at 25° C. The inks have physical properties compatible with a wide range of ejecting conditions, i.e., driving frequency of the piezo element, or ejection conditions for a thermal head, for either drop-on-demand device or a continuous device, and the shape and size of the nozzle. It is preferable that the ink (as an aqueous-based, non-aqueous-based, or a mixture of an aqueous-based and non-aqueous-based vehicles) has a sufficiently low viscosity such that it can be jetted through the printing head of an ink jet printer without the necessity of heating the print head. It is, therefore, preferable for the ink viscosity to be below about 30 centipoise (cP), as measured at 25° C. More preferably, the ink viscosity is below about 20 cP at 25° C. For drop-on-demand ink jet printers, it is preferable that the ink has a viscosity of above about 1.5 cP at 25° C. For drop-on-demand ink jet printers, it is more preferable that the ink has a viscosity of above about 1.7 cP at 25° C.

Any known ink jet printer process may be used to apply the decoration to the polymer sheet. Specific examples of ink jet printers include, for example, the HP Designjet inkjet printer, the Purgatory inkjet printer, the Vutek UltraVu 3360 inkjet printer, and the like. Printing heads useful for piezo electric processes are available from, for example, Epson, Seiko-Epson, Spectra, XAAR and XAAR-Hitachi. Printing heads useful for thermal ink jet printing are available from, for example, Hewlett-Packard and Canon. Printing heads suitable for continuous drop printing are available, for example, from Iris and Video Jet.

Regardless of the process utilized to apply the image to the polymer sheet, an adhesive or primer composition can optionally be disposed on at least one surface, i.e. upper or lower surface, of the sheet. At least a portion of the adhesive or primer composition will contact at least a portion of the image. The adhesive layer is preferably in the form of a coating, but it may also be a component of the image-forming composition, for example a component of an ink. When the adhesive/primer layer takes the form of a coating, the adhesive/primer coating is less than 1 mil thick. Preferably, the adhesive/primer coating is less than 0.5 mil thick. More preferably, the adhesive/primer coating is less than 0.1 mil thick.

The adhesive or primer composition may comprise any adhesive known in the art. The adhesive or primer composition enhances the bond strength between the image disposed on the polymer sheet and other materials, particularly to another layer in a laminate structure. Mixtures of adhesives may also be utilized. Essentially any adhesive or primer known will find utility within the present invention.

Preferably, the adhesive composition is a silane which incorporates an amine function. Specific examples of such materials include, for example; gamma-aminopropyltriethoxysilane, N-beta-(aminoethyl)-gamma-aminopropyl-trimethoxysilane, and the like and mixtures thereof. Commercial examples of such materials include, for example A-1100® silane (available from the Silquest Company, and believed to be gamma-aminopropyltrimethoxysilane) and Z6020® silane (available from The Dow Chemical Company).

The adhesive composition may be applied to at least one surface of polymer sheet through melt processes or through solution, emulsion, dispersion, and the like, coating processes. Appropriate process parameter will be known to those of ordinary skill in the art based on the type of adhesive composition used and process selected for the application of the adhesive to the polymer sheet surface. For example, when the adhesive is not included in the ink formulation, the adhesive composition may be cast, sprayed, air knifed, brushed, rolled, poured, printed or the like onto the polymer sheet surface after application of the image to the polymer sheet. Generally, the adhesive composition will be diluted with a liquid prior to application and applied as a liquid medium to provide uniform coverage over the surface of the polymer sheet. The liquid may comprise one or more components and function as a solvent for the adhesive composition to form a solution or may function as a non-solvent for the adhesive composition to form a dispersion or emulsion. Usable liquids which may serve as solvents or non-solvents include those described above for the ink compositions.

The second layer of the laminates of the present invention comprises a film. The films can be composed of any polymer known that can be used in a laminate of the present invention without detriment to the intended use. The polymers may be thermoplastic resins or elastomers, and include polymeric materials found in nature. This should not be considered limiting. Essentially any polymer may find utility as the film resin of the present invention. Preferably, the polymeric film is transparent. More preferable polymeric film materials include; poly(ethylene terephthalate), polycarbonate, polypropylene, polyethylene, polypropylene, cyclic polyloefins, norbornene polymers, polystyrene, syndiotactic polystyrene, styrene-acrylate copolymers, acrylonitrile-styrene copolymers, poly(ethylene naphthalate), polyethersulfone, polysulfone, nylons, poly(urethanes), acrylics, cellulose acetates, cellulose triacetates, cellophane, vinyl chloride polymers, polyvinyl fluoride, polyvinylidene fluoride and the like. Most preferably, the polymeric film is biaxially oriented poly(ethylene terephthalate) film.

Preferably, one or both surfaces of the polymeric film may be treated to enhance the adhesion to the polymeric sheet. This treatment may take any form known within the art, including adhesives, primers, such as silanes, flame treatments, such as disclosed within U.S. Pat. No. 2,632,921, U.S. Pat. No. 2,648,097, U.S. Pat. No. 2,683,894, and U.S. Pat. No. 2,704,382, plasma treatments, such as disclosed within U.S. Pat. No. 4,732,814, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof. For example, a thin layer of carbon may be deposited on one or both surfaces of the polymeric film through vacuum sputtering as disclosed in U.S. Pat. No. 4,865,711. For example, U.S. Pat. No. 5,415,942 discloses a hydroxy-acrylic hydrosol primer coating that may serve as an adhesion-promoting primer for poly(ethylene terephthalate) films.

Preferably, the polymeric film of the present invention includes a primer coating on one or both surfaces, more preferably both surfaces, comprising a coating of a polyallylamine-based primer. The polyallylamine-based primer and its application to a poly(ethylene terephthalate) polymeric film are disclosed within U.S. Pat. No. 5,411,845, U.S. Pat. No. 5,770,312, U.S. Pat. No. 5,690,994, and U.S. Pat. No. 5,698,329. Generally, the poly(ethylene terephthalate) film is extruded and cast as a film by conventional methods, as described above, and the polyallylamine coating is applied to the poly(ethylene terephthalate) film either before stretching or between the machine direction stretching and transverse direction stretching operations, and/or after the two stretching operations and heat setting in the stenter oven. It is preferable that the coating be applied before the transverse stretching operation so that the coated poly(ethylene terephthalate) web is heated under restraint to a temperature of about 220° C. in the stenter oven in order to cure the polyallylamine to the poly(ethylene terephthalate) surface(s). In addition to this cured coating, an additional polyallylamine coating can be applied on it after the stretching and stenter oven heat setting in order to obtain a thicker overall coating.

The thickness of the polymeric film is not critical and may be varied depending on the particular application. Generally, the thickness of the polymeric film will range from about 0.1 mils (0.003 mm), to about 10 mils (0.26 mm). For automobile windshields, the polymeric film thickness may be preferably within the range of about 1 mil (0.025 mm), to about 4 mils (0.1 mm).

The polymeric film is preferably sufficiently stress-relieved and shrink-stable under the coating and lamination processes. Preferably, the polymeric film is heat stabilized to provide low shrinkage characteristics when subjected to elevated temperatures (i.e. less than 2 percent shrinkage in both directions after 30 minutes at 150 C), such are seen through the lamination processes described below.

Preferably, the second layer of the laminates of the present invention comprises a solar control film. As used herein the term "solar control film" means a film which can reflect infrared light, absorb infrared light or a combination thereof. The major component of such films is at least one polymeric material. The polymers may be thermoplastic resins or elastomers, and include polymeric materials found in nature, as are described above for the films.

One useful class of solar control films is characterized by the presence of indium tin oxide as a component of the film or as a coating on the film surface. Polymeric films coated with indium tin oxide nanoparticles incorporated within a matrix material are commercially available. For example, the Tomoegawa Paper Company, Ltd., of Tokyo, Japan, offers a line of solar control films within their Soft Look® film product offering. The Soft Look® solar control films incorporate indium tin oxide nanoparticles dispersed within a matrix material and solution coated on biaxially stretched poly(ethylene terephthalate) film. The Soft Look® solar control films also incorporate a UV shielding hard coat layer in contact with the indium tin oxide infrared shielding layer and may further incorporate adhesive layers as the outer layers of the films. Typical examples of such films are characterized by having a visible radiation transmittance of 85.80 percent, sunlight radiation transmittance of 68.5 percent, a sunlight reflectance of 7.9 percent, and a screening factor of 0.86. Soft Look® solar control films are also typically hardcoated to improve the abrasion resistance. Specific grades of Soft Look® solar control films include; Soft Look® UV/IR 25 solar control film and Soft Look® UV/IR 50 solar control film.

Another useful class of solar control films suitable for use as the second layer of the laminates of the invention includes polymeric films having antimony tin oxide as a component of the film or present in a coating on the film surface. Polymeric films coated with antimony tin oxide nanoparticles incorporated within a matrix material known as RAYBARRIER® films are commercially available from the Sumitomo Osaka Cement Company. RAYBARRIER® solar control films incorporate antimony tin oxide nanoparticles with a nominal particle size of about 10 nm dispersed within a matrix material and coated on biaxially stretched poly(ethylene terephthalate) film. Typical optical properties of these control films include a visible radiation transmittance of 78.9 percent, sunlight radiation transmittance of 66.0 percent, a sunlight reflectance of 8.4 percent, a UV transmittance of 0.4 percent, and a screening factor of 0.8. The RAYBARRIER® solar control films are also typically hardcoated to improve the abrasion resistance with typical values of a delta H (defined as the haze difference of before and after the Taber abrasion test) of 4.9 percent within a Taber abrasion test (abrasion wheel: CS-10F, Load: 1000 grams and abrasion cycle: 100 cycles). Specific grades of RAYBARRIER® solar control films include; RAYBARRIER® TFK-2583 solar control film with a visible radiation transmittance of 81.6 percent, a sunlight radiation transmittance of 66.8 percent and a haze value of 1.1 percent, RAYBARRIER® TFM-5065 solar control film with a visible radiation transmittance of 67.1 percent, a sunlight radiation transmittance of 47.5 percent and a haze value of 0.4 percent, RAYBARRIER® SFJ-5030 solar control film with a visible radiation transmittance of 29.2 percent, a sunlight radiation transmittance of 43.0 percent and a haze value of 1.0 percent, RAYBARRIER® SFI-5010 solar control film with a visible radiation transmittance of 12.0 percent, a sunlight radiation transmittance of 26.3 percent and a haze value of 0.8 percent, RAYBARRIER® SFH-5040 solar control film with a visible radiation transmittance of 41.5 percent, a sunlight radiation transmittance of 41.9 percent and a haze value of 0.7 percent and RAYBARRIER® SFG-5015 solar control film with a visible radiation transmittance of 14.8 percent, a sunlight radiation transmittance of 20.9 percent and a haze value of 0 percent.

Another suitable class of solar control films that may be used as the second layer of the laminate of the invention includes polymeric films which incorporate lanthanum hexaboride nanoparticles as a component or a coating. Commercially available examples are available from the Sumitomo Metal Mining Company of Tokyo, Japan. One type incorporates lanthanum hexaboride nanoparticles.

The solar control films may further incorporate other absorptive materials, such as, for example, organic infrared absorbents, for example, polymethine dyes, amminium dyes, imminium dyes, dithiolene-type dyes and phthalocyanine-type dyes and pigments. Combinations of such additives are also useful as components of the solar control film.

Although the solar control film that forms the second layer of the laminate may reflect infrared light or absorb infrared light, preferably, the solar control film reflects infrared light. Reflective films are metallized polymeric films and include any film with an infrared energy reflective layer. Thus, the second layer may be a simple semi-transparent metal layer or it may comprise a series of metal/dielectric layers. Such stacks are commonly referred to as interference filters of the Fabry-Perot type. Each layer may be angstrom thick or thicker. The thickness of the various layers in the filter are controlled to achieve an optimum balance between the desired infrared reflectance while maintaining visible light transmittance. The metal layers are separated (i.e. sandwiched between) by one or more dielectric layers. Reflection of visible light from the metal layers interferes destructively, thereby enhancing visible light transmission. Suitable metals for the metal layers includes, for example, silver, palladium, aluminum, chromium, nickel, copper, gold, zinc, tin, brass, stainless steel, titanium nitride, and alloys or claddings thereof. For optical purposes, silver and silver-gold alloys are preferred. Metal layer thickness are generally in the range of from about 60 to about 200 Å, preferably within the range from about 80 to about 140 Å. In general, the dielectric material should be chosen with a refractive index greater than that of the laminate layer it contacts. In general, a higher refractive index of the dielectric layers is desirable. Preferably, the dielectric material will have a refractive index of greater than about 1.8. More preferably, the dielectric material will have a refractive index of greater than about 2.0. The dielectric layer material should be transparent over the visible range and at least one dielectric layer must exist between a pair of metal layers. Suitable dielectric materials for the dielectric layers includes, for example; zirconium oxide, tantalum oxide, tungsten oxide, indium oxide, tin oxide, indium tin oxide, aluminum oxide, zinc sulfide, zinc oxide, magnesium fluoride, niobium oxide, silicon nitride, and titanium oxide. Preferably dielectric materials include tungsten oxide, indium oxide, tin oxide, and indium tin oxide. Generally, the layers are formed through vacuum deposition processes, such as vacuum evaporation processes or sputtering deposition processes. Examples of such processes include resistance heated, laser heated or electron-beam vaporization evaporation processes and DC or RF sputtering processes (diode and magnetron) under normal and reactive conditions. Preferably, the reflective layer is made up of one or more semi transparent metal layers bounded on each side by transparent dielectric layers. One form known as an interference filter comprises at least one layer of reflective metal sandwiched between reflection-suppressing or anti-reflective dielectric layers. These layers are usually arranged in sequence as stacks carried by an appropriate transparent planar substrate such as a biaxially oriented polyethylene terephthalate film. These layers can be adjusted to reflect particular wave lengths of energy, in particular heat and other infrared wavelengths, as disclosed in U.S. Pat. Nos. 4,799,745 and 4,973,511. Varying the thickness and composition of a dielectric layer spaced between two reflecting metal layers will vary the optical transmittance/ reflection properties considerably. More specifically, varying the thickness of the spacing dielectric layer varies the wave length associated with the reflection suppression (or transmission enhancement) band.

In addition to the choice of metal, thickness also determines its reflectivity. Generally, the thinner the layer, the less is its reflectivity. Generally, the thickness of the spacing dielectric layer(s) is between about 200 to about 1200 Å, preferably between about 450 to about 1000 Å, to obtain the desired optical properties. The preferred dielectric stack for automotive uses contains at least two near infrared reflecting metal layers. In the operative position such stacks transmit at least 70 percent visible light of normal incidence measured as specified in ANSI Z26.1. Architectural applications may utilize dielectric stacks with lower levels of visible light transmittance. Preferably, visible light reflectance, normal from the surface of the stack is less than about 8 percent. Exterior dielectric layers in contact with the metal layer surfaces opposite to the metal surfaces contacting spacing dielectric layers further enhances anti-reflection performance. The thickness of such exterior or outside dielectric layers is generally about 20 to about 600 Å, preferably about 50 to about 500 Å.

Metal dielectric constructs are manufactured commercially, for example by Southwall Technologies, Inc. Constructs are available as laminated and non-laminated structures with silver and silver/gold as the metal and indium oxide and indium tin oxide as the dielectric. Specific examples include XIR® 70, which has a 70 percent visible light transmittance, a 9 percent visible light reflectance (exterior), a 46 percent total solar transmittance, a 22 percent solar reflectance (exterior), a relative heat gain of 117 and a greater than 99 percent ultraviolet blockage and XIR® 75, which has a 75 percent visible light transmittance, a 11 percent visible light reflectance (exterior), a 52 percent total solar transmittance, a 23 percent solar reflectance (exterior), a relative heat gain of 135 and a greater than 99 percent ultraviolet blockage when placed in a 2.1 mm clear glass/XIR® film/polyvinyl butyral interlayer/2.1 mm clear glass construction.

Preferably, one or both surfaces of the polymeric film may be treated to enhance the adhesion to the coating or to the polymeric sheet or both, as described above.

The thickness of the solar control film that forms the second layer of the laminate of the invention is not critical and may be varied depending on the particular application. The thickness of the polymeric film will generally range from about 0.1 mils (0.003 mm), to about 10 mils (0.26 mm). In embodiments useful for automobile windshields, the polymeric film thickness is preferably within the range of about 1 mil (0.025 mm), to about 4 mils (0.1 mm).

Preferably, the solar control film includes a primer coating on one or both surfaces, more preferably both surfaces, comprising a coating of a polyallylamine-based primer, as described above.

The solar control film is preferably sufficiently stress-relieved and shrink-stable under the coating and lamination processes. Preferably, the polymeric film is heat stabilized to provide low shrinkage characteristics when subjected to elevated temperatures (i.e. less than 2 percent shrinkage in both directions after 30 minutes at 150° C.)

Laminates of the present invention include those which comprise at least one decorated polyvinyl butyral sheet layer (i.e. a layer having an image disposed thereon) and at least one film or solar control film layer; laminates which comprise at least one decorated polyvinyl butyral sheet layer and at least two films or solar control film layers; laminates which comprise at least one decorated polyvinyl butyral sheet layer, at least one additional undecorated polymer sheet layer (i.e. a layer having no image disposed thereon) and at least one film or solar control film layer; laminates which comprise at least one rigid sheet layer, at least one decorated polyvinyl butyral sheet layer and at least one film or solar control film layer; laminates which comprise at least one rigid sheet layer, at least one decorated polyvinyl butyral sheet layer, at least one additional undecorated polymer sheet layer and at least one polymer film layer; and laminates which comprise at least two rigid sheet layers, at least one decorated polyvinyl butyral sheet layer, at least one additional polymer sheet layer and at least one polymer film layer.

The rigid sheet layers may be glass or rigid transparent plastic sheets, such as, for example, polycarbonate, acrylics, polyacrylate, cyclic polyolefins, such as ethylene norbornene polymers, metallocene-catalyzed polystyrene and the like. Blends of such materials may also form the rigid sheet. Metal or ceramic plates may be substituted for the rigid polymeric sheet or glass if clarity is not required for the laminate. The term "glass" is meant to include not only window glass, plate glass, silicate glass, sheet glass, and float glass, but also includes colored glass, specialty glass which includes ingredients to control, for example, solar heating, coated glass with, for example, sputtered metals, such as silver or indium tin oxide, for solar control purposes, E-glass, Toroglass, Solex® glass and the like. Such specialty glasses are disclosed in U.S. Pat. Nos. 4,615,989; 5,173,212; 5,264,286; 6,150,028; 6,340,646; 6,461,736; and 6,468,934. The type of glass to be selected for a particular laminate depends on the intended use. Within any of the above embodiments, the rigid sheets may be substituted independently for any other type of rigid sheet.

The laminates of the present invention may optionally include additional layers, such as other polymeric sheets, other uncoated polymeric films, such as biaxially oriented polyethylene terephthalate film, and other coated polymeric films. Examples of other polymeric sheets would include those produced from materials with a modulus of 20,000 psi (138 MPa) or less as measured by ASTM Method D-638-03 or greater than 20,000 psi. The polymeric film and sheets of the additional layer or layers may provide additional attributes, such as acoustical barriers. Polymeric films and sheets which provide acoustical dampening include, for example, ethylene vinyl acetate copolymers, ethylene methyl acrylate copolymers, plasticized polyvinyl chloride resins, metallocene-catalyzed polyethylene compositions, polyurethanes, polyvinyl butyral compositions, highly plasticized polyvinyl butyral compositions, silicone/acrylate ("ISD") resins, and the like. Such "acoustic barrier" resins are disclosed in U.S. Pat. Nos. 5,368,917; 5,624,763; 5,773,102; and 6,432,522. Preferably, the polymeric film or sheet of the additional layer or layers is formed of a polymer selected from the group consisting of polycarbonate, polyurethane, acrylic polymers, polymethyl methacrylate, polyvinyl chloride, polyester, poly(ethylene-co-vinyl acetate) compositions, poly(vinyl butyral) compositions, acoustic poly(vinyl acetal) compositions, acoustic poly(vinyl butyral) compositions, poly(ethylene-co-acrylic acid) ionomers, poly(ethylene-co-methacrylic acid) ionomers and biaxially oriented poly(ethylene terephthalate).

Adhesives or primers, as described above, may be applied to the additional film layers, especially to provide adequate adhesion between the additional polymeric layer film layer or layers and the polyvinyl butyral and/or film or solar control film layers of the laminates of the present invention.

The processes which may be used to produce the laminates of the present invention are numerous and various. In the simplest process, the decorated polymer sheet of the invention is contacted with a second film or solar control film, for example by laying the second film atop the surface of the polymer sheet of the invention upon which the image is disposed.

Typically, pressure will be applied during formation of the laminate. One process useful to produce a laminate comprising the decorated polymeric sheet of the invention laminated to a polymeric film (coated or uncoated) comprises steps of lightly bonding the sheet to the film through a nip roll bonding process. In such a process, polymeric film is supplied from a roll and first passes over a tension roll. The film may be subjected to moderate heating by passing through a heating zone, such as an oven. The decorated polymeric sheet may also be supplied from a roll and will typically first pass over a tension roll. The decorated polymeric sheet may be subjected to moderate heating by passing through a heating zone, such as an oven. Heating the film and sheet to a temperature sufficient to promote temporary fusion bonding, i.e.; to cause the surfaces of the decorated polymeric sheet to become tacky, is useful. Suitable temperatures for the decorated polymeric sheets of the invention will be within the range of about 50° C. to about 120° C., with the preferred surface temperatures reaching about 65° C. The film is fed along with the decorated polymeric sheet through nip rolls where the two layers are merged together under moderate pressure to form a weakly bonded laminate. If desired, the nip rolls may be heated to promote the bonding process. The bonding pressure exerted by the nip rolls may vary with the film materials, the decorated polymeric sheet materials, and the temperatures employed. Generally the bonding pressure will be within the range of about 10 psi (0.7 kg/sq cm), to about 75 psi (5.3 kg/sq cm), and is preferably within the range of about 25 psi (1.8 kg/sq cm), to about 30 psi (2.1 kg/sq cm). The tension of the decorated polymeric sheet/film laminate is controlled by passage over an idler roll. Typical line speeds through the roll assembly are within the range of about 5 feet (1.5 m), to about 30 feet (9.2 m), per minute. Proper control of the speed and the tension tends to minimize wrinkling of the film. After bonding, the laminate is passed over a series of cooling rolls which ensure that the laminate taken up on a roll is not tacky. Tension within the system may be further maintained through the use of idler rolls. Laminates made according to this process will have sufficient strength to allow handling by laminators who may produce further laminates, such as glass laminates, which encapsulate this two-layer laminate. This process may be modified to produce a wide variety of laminate types. For example, the film may be encapsulated between the decorated polymeric sheet of the invention and another polymeric sheet by the addition of another polymeric sheet to the above process; the decorated polymeric sheet may be encapsulated between two polymeric films by the addition of a second film; the decorated polymeric sheet may be encapsulated between a polymeric film and an other polymeric sheet through the addition of an other polymeric sheet; and so forth. Adhesives and primers may be used to enhance the bond strength between the laminate layers, if desired.

In a typical autoclave process, a glass sheet, a laminate of the invention composed of a decorated polyvinyl butyral sheet (i.e. having an image disposed on a surface), a metallized film, a second polyvinyl butyral sheet and a second glass sheet are laminated together under heat and pressure and a vacuum (for example, in the range of about 27-28 inches (689-711 mm) Hg), to remove air. Preferably, the glass sheets have been washed and dried. A typical glass type is 90 mil thick annealed flat glass. In a typical procedure, the laminate of the present invention is positioned between two glass plates to form a glass/interlayer/glass assembly, placing the assembly into a bag capable of sustaining a vacuum ("a vacuum bag"), drawing the air out of the bag using a vacuum line or other means of pulling a vacuum on the bag, sealing the bag while maintaining the vacuum, placing the sealed bag in an autoclave at a temperature of about 130° C. to about 180° C., at a pressure of about 200 psi (15 bars), for from about 10 to about 50 minutes. Preferably the bag is autoclaved at a temperature of from about 120° C. to about 160° C. for 20 minutes to about 45 minutes. More preferably the bag is autoclaved at a temperature of from about 135° C. to about 160° C. for 20 minutes to about 40 minutes. Most preferably the bag is autoclaved at a temperature of from about 145° C. to about 155° C. for 25 minutes to about 35 minutes. A vacuum ring may be substituted for the vacuum bag. One type of vacuum bags is disclosed in U.S. Pat. No. 3,311,517.

Alternatively, other processes may be used to produce the laminates of the present invention. Any air trapped within the glass/interlayer/glass assembly may be removed through a nip roll process. For example, the glass/interlayer/glass assembly may be heated in an oven at between about 80 and about 120 C, preferably between about 90 and about 100 C, for about 30 minutes. Thereafter, the heated glass/interlayer/glass assembly is passed through a set of nip rolls so that the air in the void spaces between the glass and the interlayer may be squeezed out, and the edge of the assembly sealed. The assembly at this stage is referred to as a pre-press. The pre-press assembly may then placed in an air autoclave where the temperature is raised to between about 120° C. and about 160° C., preferably between about 135° C. and about 160° C., and pressure to between about 100 psig to about 300 psig, preferably about 200 psig (14.3 bar). These conditions are maintained for about 15 minutes to about 1 hour, preferably about 20 minutes to about 50 minutes, after which, the air is cooled while no more air is added to the autoclave. After about 20 minutes of cooling, the autoclave is vented and the laminates are removed.

The laminates of the present invention may also be produced through non-autoclave processes. Such non-autoclave processes are disclosed, for example, in U.S. Pat. Nos. 3,234,062; 3,852,136; 4,341,576; 4,385,951; 4,398,979; 5,536,347; 5,853,516; 6,342,116; 5,415,909; U.S. Published Patent Application 2004/0182493, European Patent 1 235 683 B1, PCT Publication WO 91/01880 and PCT Publication WO 03/057478 A1. Generally, non-autoclave processes include heating the pre-press assembly and the application of vacuum, pressure or both. For example, the pre-press may be successively passed through heating ovens and nip rolls.

The invention is further illustrated by the following examples of certain embodiments.

EXAMPLES

Example 1

An ink set is prepared that consists of the ink formulations shown in Table I where percentages are based on the total weight of the ink formulation. The pigment dispersion compositions and preparations are as disclosed in the Examples of U.S. Published Patent Application 2004/0187732.

TABLE I

| Magenta | 36.08 wt. % of a magenta pigment dispersion (7 wt. % pigment) |
| | 38.35 wt. % Dowanol ® DPMA[1] |
| | 25.57 wt. % Dowanol ® DPnP[1] |

TABLE I-continued

| | |
|---|---|
| Yellow | 35.23 wt. % of a yellow pigment dispersion (7 wt. % pigment) 38.86 wt. % Dowanol ® DPMA[1] 25.91 wt. % Dowanol ® DPnP[1] |
| Cyan | 28.35 wt. % of a cyan pigment dispersion (5.5 wt. % pigment) 42.99 wt. % Dowanol ® DPMA[1] 28.66 wt. % Dowanol ® DPM[1] |
| Black | 27.43 weight percent of a black pigment dispersion (7 weight percent pigment) 43.54 weight percent Dowanol ® DPMA[1] 29.03 weight percent Dowanol ® DPM[1] |

[1]Available from The Dow Chemical Company of Midland, MI

Using the above mentioned ink set, an image is applied to a 30 mil thick (0.75 mm) Butacite® polyvinyl butyral sheet (a product of the DuPont Company) by ink jet printing with an Epson 3000 printer to provide an ink coverage of 25% to form a decorated polymer sheet. A glass laminate composed of a first glass layer, the decorated polymer sheet, a surface flame-treated, biaxially oriented polyethylene terephthalate (PET) film, an undecorated Butacite® polyvinyl butyral (PVB) sheet and a second glass layer is produced as follows. The decorated polymer sheet (12 inches by 12 inches (305 mm×305 mm), the surface flame-treated, biaxially oriented PET film (12 inches by 12 inches (305 mm×305 mm) by 4 mils (0.10 mm) thick) and the undecorated PVB sheet (12 inches by 12 inches (305 mm×305 mm) by 15 mils (0.38 mm) thick) are conditioned at 23% relative humidity (RH) at a temperature of 72° F. overnight. The laminate is prepared by stacking a clear annealed float glass plate layer (12 inches by 12 inches (305 mm×305 mm) by 2.5 mm thick), the decorated polymer sheet layer, the PET film layer, the undecorated PVB sheet layer and a second clear annealed float glass plate layer (12 inches by 12 inches (305 mm×305 mm) by 2.5 mm thick). The glass/decorated polymer sheet/PET film/undecorated PVB sheet/glass laminate is then placed into a vacuum bag and heated to 90°-100° C. for 30 minutes to remove any air contained between the glass/decorated polymer sheet/PET film/undecorated PVB sheet/glass laminate layers, forming a pre-press assembly. The pre-press assembly is then subjected to autoclaving at 135° C. for 30 minutes in an air autoclave to a pressure of 200 psig (14.3 bar). The air is then cooled and no further air is introduced to the autoclave. After 20 minutes of cooling and when the air temperature in the autoclave is less than about 50° C., the autoclave is vented, and the autoclaved glass/decorated polymer sheet/PET film/undecorated PVB sheet/glass laminate is removed.

Example 2

Using the ink set of Example 1, an image is applied to a 30 mil thick (0.75 mm) Butacite® polyvinyl butyral sheet of Example 1 by ink jet printing with an Epson 3000 printer to provide an ink coverage of 50% to form a decorated polymer sheet. A glass laminate composed of a first glass layer, the decorated polymer sheet, and a surface flame-treated, biaxially oriented polyethylene terephthalate (PET) film (12 inches by 12 inches (305 mm×305 mm) by 4 mils (0.10 mm) thick) is produced in the following manner. The decorated polymer sheet (12 inches by 12 inches (305 mm×305 mm)) and the PET film are conditioned at 23% relative humidity (RH) at a temperature of 72° F. overnight. A laminate is prepared by stacking a clear annealed float glass plate layer (12 inches by 12 inches (305 mm×305 mm) by 2.5 mm thick), the decorated polymer sheet layer, the PET film layer, a thin Teflon® film layer (12 inches by 12 inches (305 mm×305 mm)) and a clear annealed float glass plate layer (12 inches by 12 inches (305 mm×305 mm) by 2.5 mm thick). The glass/decorated polymer sheet/PET film/Teflon® film/glass laminate is then placed into a vacuum bag and heated to 90°-100° C. for 30 minutes to remove any air contained between the glass/decorated polymer sheet/glass laminate layers, forming a pre-press assembly. The pre-press assembly is then subjected to autoclaving, cooling and removal from the autoclave as described in Example 1 to produce an autoclaved glass/decorated polymer sheet/PET film/Teflon® film/glass laminate. Removal of the second glass sheet and the thin Teflon® film provides a glass/decorated polymer sheet/PET film laminate.

Example 3

Using the ink set of Example 1, an image is applied to a 30 mil thick (0.75 mm) Butacite® polyvinyl butyral sheet of Example 1 by ink jet printing with an Epson 3000 printer to provide an ink coverage of 75%. An adhesive composition consisting of a solution of A-1100 silane (0.025 wt. % based on the total weight of the solution, a product of the Silquest Company, believed to be gamma-aminopropyltrimethoxysilane), isopropanol (66.65 wt. % based on the total weight of the solution) and water (33.32 wt. % based on the total weight of the solution) is prepared and allowed to sit for at least one hour prior to use. A 12-inch by 12-inch piece of the decorated Butacite® sheet is dipped into the silane solution (residence time of about 1 minute), removed and allowed to drain and dry under ambient conditions to form a decorated polymer sheet. A glass laminate composed of a glass layer, the decorated polymer sheet, a poly(allyl amine) primed, biaxially oriented polyethylene terephthalate (PET) film, an undecorated Butacite® polyvinyl butyral (PVB) sheet, and a second glass layer is produced, including conditioning of the decorated sheet, PET film and undecorated PVB sheet, as described in Example 2. The laminate is produced by stacking a clear annealed float glass plate layer (12 inches by 12 inches (305 mm×305 mm) by 2.5 mm thick), the decorated polymer sheet layer (12 inches by 12 inches (305 mm×305 mm), the PET film layer (12 inches by 12 inches (305 mm×305 mm) by 4 mils (0.10 mm) thick), the undecorated PVB sheet (12 inches by 12 inches (305 mm×305 mm) by 15 mils (0.38 mm) thick) and a second clear annealed float glass plate layer (12 inches by 12 inches (305 mm×305 mm) by 2.5 mm thick). The glass/decorated polymer sheet/PET film/undecorated PVB sheet/glass laminate is treated in a vacuum bag as described in Example 2 to remove any air contained between the glass/decorated polymer sheet/PET film/undecorated PVB sheet/glass laminate layers, forming a pre-press assembly. The pre-press assembly is then subjected to autoclaving, cooling and removal from the autoclave as described in Example 1 to produce an autoclaved glass/decorated polymer sheet/PET film/undecorated PVB sheet/glass laminate.

Example 4

Using the ink set of Example 1, an image is applied to a 30 mil thick (0.75 mm) Butacite® polyvinyl butyral sheet of Example 1 by ink jet printing with an Epson 3000 printer to provide an ink coverage of 100%. An adhesive composition consisting of a solution of A-1100 silane (0.10 wt. % based on the total weight of the solution, a product of the Silquest Company, believed to be gamma-aminopropyltrimethoxysilane), acetic acid (0.01 wt. % based on the total weight of the solution), isopropanol (66.59 wt. % based on the total weight of the solution) and water (33.30 wt. % based on the total weight of the solution) is prepared. A 12-inch by 12-inch piece of the decorated Butacite® sheet is dipped into the silane solution (residence time of about 1 minute), removed and allowed to drain and dry under ambient conditions to form a decorated polymer sheet. A glass laminate composed of a first glass layer, the decorated polymer sheet, and a XIR®-70 HP Auto film (Auto film) (a product of the Southwall Company), layer is produced, including conditioning of the decorated polymer sheet and Auto film, as described in Example 2. The laminate is produced by stacking a clear annealed float glass plate layer (12 inches by 12 inches (305 mm×305 mm) by 2.5 mm thick), the decorated polymer sheet layer (12 inches by 12 inches (305 mm×305 mm)), the Auto film layer (12 inches by 12 inches (305 mm×305 mm) by 2 mils (0.05 mm) thick), a thin Teflon® film layer (12 inches by 12 inches (305 mm×305 mm)) and a second clear annealed float glass plate layer (12 inches by 12 inches (305 mm×305 mm) by 2.5 mm thick). The layers are stacked such that the metallized surface of the XIR®-70 HP Auto film contacts a surface of the decorated sheet layer. The glass/decorated polymer sheet/Auto film layer/Teflon® film/glass laminate is then treated in a vacuum bag as described in Example 2 to remove any air contained between the glass/decorated polymer sheet/Auto film layer/Teflon® film/glass laminate layers, forming a pre-press assembly. The pre-press assembly is then subjected to autoclaving, cooling and removal from the autoclave as described in Example 1 to produce an autoclaved glass/decorated polymer sheet/Auto film layer/Teflon® film/ glass laminate. Removal of the second glass layer and the Teflon® film provides a glass/decorated polymer sheet/Auto film layer laminate.

Example 5

Using the ink set of Example 1, an image is applied to a 30 mil thick (0.75 mm) Butacite® polyvinyl butyral sheet of Example 1 by ink jet printing with an Epson 3000 printer to provide an ink coverage of 200%, forming a decorated polymer sheet. A glass laminate composed of a first glass layer, the decorated polymer sheet, an XIR®-75 Auto Blue V-1 film (Auto film) (a product of the Southwall Company), an undecorated Butacite® polyvinyl butyral (PVB) sheet and a second glass layer is produced and conditioned, including conditioning of the decorated sheet, undecorated PVB sheet and Auto film, as described in Example 2. The laminate is produced by stacking a clear annealed float glass plate layer (12 inches by 12 inches (305 mm×305 mm) by 2.5 mm thick), the decorated polymer sheet layer, the Auto film layer (12 inches by 12 inches (305 mm×305 mm) by 1.8 mils (0.046 mm) thick), the undecorated PVB sheet layer (12 inches by 12 inches (305 mm×305 mm) by 15 mils (0.38 mm) thick) and a second clear annealed float glass plate layer (12 inches by 12 inches (305 mm×305 mm) by 2.5 mm thick). The glass/ decorated polymer sheet/Auto film/undecorated PVB sheet/ glass laminate is then treated in a vacuum bag as described in Example 2 to remove any air contained between the glass/ decorated polymer sheet/glass laminate layers, forming a pre-press assembly. The pre-press assembly is then subjected to autoclaving, cooling and removal from the autoclave as described in Example 1 to produce an autoclaved glass/decorated polymer sheet/Auto film/undecorated PVB sheet/glass laminate.

Example 6

Using the ink set of Example 1, an image is applied to a 30 mil thick (0.75 mm) Butacite® polyvinyl butyral sheet by ink jet printing with an Epson 3000 printer to provide a ink coverage of 300%. A glass laminate composed of a first glass layer, the decorated polymer sheet, and a Soft Look® UV/IR 25 solar control film (a product of the Tomoegawa Paper Company, Ltd., of Tokyo, Japan) (solar control film), layer is produced and conditioned as described in Example 2, including conditioning of the decorated polymer sheet and the solar control film. The laminate is formed by stacking a clear annealed float glass plate layer (12 inches by 12 inches (305 mm×305 mm) by 2.5 mm thick), the decorated polymer sheet layer (12 inches by 12 inches (305 mm×305 mm)), the solar control film (12 inches by 12 inches (305 mm×305 mm)), a thin Teflon® film layer (12 inches by 12 inches (305 mm×305 mm)) and a second clear annealed float glass plate layer (12 inches by 12 inches (305 mm×305 mm) by 2.5 mm thick). The layers are stacked such that the coated surface of the solar control film contacts a surface of the decorated sheet layer. The glass/decorated polymer sheet/solar control film/Teflon® film/glass laminate is then treated in a vacuum bag as described in Example 2 to remove any air contained between the glass/decorated polymer sheet/solar control film/Teflon® film/glass laminate layers, forming a pre-press assembly. The glass/decorated polymer sheet/glass pre-press assembly is then subjected to autoclaving, cooling and removal from the autoclave as described in Example 1 to produce an autoclaved glass/decorated polymer sheet/solar control film/Teflon® film/glass laminate. Removal of the glass cover sheet and the thin Teflon® film provides a glass/decorated polymer sheet/ solar control film laminate.

Example 7

Using the ink set of Example 1, an image is applied to a 30 mil thick (0.75 mm) Butacite® polyvinyl butyral sheet of Example 1 by ink jet printing with an Epson 3000 printer to provide a ink coverage of 400 percent. An adhesive composition consisting of a solution of A-1100 silane (0.05 wt. % based on the total weight of the solution, a product of the Silquest Company, believed to be gamma-aminopropyltrimethoxysilane), isopropanol (66.63 wt. % based on the total weight of the solution), and water (33.32 wt. % based on the total weight of the solution), is prepared and allowed to sit for at least one hour prior to use. A 12-inch by 12-inch piece of the decorated Butacite® sheet is dipped into the silane solution (residence time of about 1 minute), removed and allowed to drain and dry under ambient conditions to form a decorated polymer sheet.

An acoustic polyvinyl butyral (PVB) composition is prepared by mixing a PVB having a hydroxyl number of 18.5 with a plasticizer solution of tetraethylene glycol diheptanoate with 4 grams per liter of Tinuvin® P, 1.2 grams per liter of Tinuvin® 123 (both products of the Ciba Company), and 8 grams per liter of octylphenol. The composition is extruded in a manner such that the residence time in the extruder is within the range of 10 to 25 minutes. The weight ratio of the plasticizer to the dry PVB flake in the feed to the extruder is 46:100. An aqueous solution of 3:1 parts by weight potassium acetate:magnesium acetate is injected during the extrusion to deliver a potassium concentration of 50 to 100 ppm. The melt temperature measured at the slot die is between 190° C. and 215° C. The molten sheet is quenched in a water bath. The self-supporting sheet is passed through a dryer where excess water is allowed to evaporate and then through a relaxer where "quenched-in stresses" are substantially relieved. The sheeting is then chilled to less than 10° C., slit along the mid-point of the web width and then wound up into rolls. The die lips at extrusion are adjusted to give the sheeting immediately before slitting a flat cross-sectional thickness profile to form an acoustic PVB film. After slitting, two rolls of flat acoustic PVB sheet are wound up into rolls. The average thickness profile in each roll is 20 mils (0.51 mm). The roll width is 1.12 meters.

A glass laminate composed of a first glass layer, the decorated polymer sheet, a XIR®-75 Green film (a product of the Southwall Company) (green film), the acoustic PVB sheet and a second glass layer is produced in the following manner. The decorated polymer sheet (12 inches by 12 inches (305 mm×305 mm)), green film (12 inches by 12 inches (305 mm×305 mm) by 1.8 mils (0.046 mm) thick) and acoustic PVB sheet (12 inches by 12 inches (305 mm×305 mm) by 20 mils (0.51 mm) thick) are conditioned as described in Example 2. The laminate is produced by stacking a clear annealed float glass plate layer (12 inches by 12 inches (305 mm×305 mm) by 2.5 mm thick), the decorated polymer sheet layer, green film layer, acoustic PVB sheet and a second clear annealed float glass glass/decorated polymer sheet/green film/acoustic PVB/glass laminate is then placed into a vacuum bag and heated to 90°-100° C. for 30 minutes to remove any air contained between the glass/decorated polymer sheet/green film/acoustic PVB/glass laminate layers to form a pre-press assembly. The pre-press assembly is then subjected to autoclaving, cooling and removal from the autoclave as described in Example 1 to produce an autoclaved glass/decorated polymer sheet/green film/acoustic PVB/glass laminate.

Example 8

Using the ink set of Example 1, an image is applied to a 15 mil thick (0.38 mm) Butacite® polyvinyl butyral sheet (a product of the DuPont Company) by ink jet printing with an Epson 3000 printer to provide a ink coverage of 25%, thus forming a decorated polymer sheet. A glass laminate composed of a glass layer, the decorated polymer sheet, an additional Butacite® polyvinyl butyral (undecorated PVB) sheet and a RAYBARRIER® TFK-2583 solar control film (a product of the Sumitomo Osaka Cement Company) is produced in the following manner. The decorated polymer sheet (12 inches by 12 inches (305 mm×305 mm)), the additional PVB sheet (12 inches by 12 inches (305 mm×305 mm) by 15 mils thick (0.38 mm)) and the solar control film (12 inches by 12 inches (305 mm×305 mm)) are conditioned at 23% relative humidity (RH) at a temperature of 72° F. overnight. The laminate is produced by stacking a clear annealed float glass plate layer (12 inches by 12 inches (305 mm×305 mm) by 2.5 mm thick), the decorated polymer sheet layer, the undecorated PVB sheet layer, the solar control film layer, a thin Teflon® film layer (12 inches by 12 inches (305 mm×305 mm)) and a second clear annealed float glass plate layer (12 inches by 12 inches (305 mm×305 mm) by 2.5 mm thick). The layers are stacked such that the coated surface of the solar control film is in contact with the undecorated PVB sheet. The glass/decorated polymer sheet/undecorated PVB sheet/solar control film/Teflon® film/glass laminate is then placed into a vacuum bag and heated to 90°-100° C. for 30 minutes to remove any air contained between the glass/decorated polymer sheet/undecorated PVB sheet/solar control film/Teflon® film/glass laminate layers to form a pre-press assembly. The pre-press assembly is then subjected to autoclaving, cooling and removal from the autoclave as described in Example 1 to produce an autoclaved glass/decorated polymer sheet/undecorated PVB sheet/solar control film/Teflon® film/glass laminate. Removal of the Teflon® film and second glass layers produces a glass/decorated polymer sheet/undecorated PVB sheet/solar control film laminate.

Example 9

Using the ink set of Example 1, an image is applied to a 15 mil thick (0.38 mm) Butacite® polyvinyl butyral sheet of Example 8 by ink jet printing with an Epson 3000 printer to provide a ink coverage of 75% thus forming a decorated polymer sheet. A glass laminate composed of a glass layer, the decorated polymer sheet, an undecorated Butacite® polyvinyl butyral (PVB) sheet, a XIR®-70 HP film (a product of the Southwall Company) (solar control film) and a glass layer is produced in the following manner. The decorated polymer sheet (12 inches by 12 inches (305 mm×305 mm)), the undecorated PVB sheet (12 inches by 12 inches (305 mm×305 mm) by 15 mils thick (0.38 mm)) and the solar control film (12 inches by 12 inches (305 mm×305 mm) by 1 mil (0.026 mm) thick) are conditioned at 23% relative humidity (RH) at a temperature of 72° F. overnight. The laminate is produced by stacking a clear annealed float glass plate layer (12 inches by 12 inches (305 mm×305 mm) by 2.5 mm thick), the decorated polymer sheet layer, the solar control film layer, the undecorated PVB sheet layer and a second clear annealed float glass plate layer (12 inches by 12 inches (305 mm×305 mm) by 2.5 mm thick). The glass/decorated polymer sheet/solar control film/undecorated PVB sheet/glass laminate is then placed into a vacuum bag and heated to 90°-100° C. for 30 minutes to remove any air contained between the glass/decorated polymer sheet/solar control film/undecorated PVB sheet/glass laminate layers to form a pre-press assembly. The pre-press assembly is then subjected to autoclaving, cooling and removal from the autoclave as described in Example 1 to produce an autoclaved glass/decorated polymer sheet/solar control film/undecorated PVB sheet/glass laminate.

Example 10

Using the ink set of Example 1, an image is applied to a 15 mil thick (0.38 mm) Butacite® polyvinyl butyral sheet of Example 8 by ink jet printing with an Epson 3000 printer to provide a ink coverage of 150%. An adhesive composition consisting of a solution of A-1100 silane (0.05 wt. % based on the total weight of the solution, a product of the Silquest Company, believed to be gamma-aminopropyltrimethoxysilane), isopropanol (66.63 wt. % based on the total weight of the solution), and water (33.32 wt. % based on the total weight of the solution), is prepared and allowed to sit for at least one hour prior to use. A 12-inch by 12-inch piece of the decorated Butacite® sheet is dipped into the silane solution (residence time of about 1 minute), removed and allowed to drain and dry under ambient conditions to form a decorated polymer sheet. A glass laminate composed of a glass layer, the decorated polymer, an undecorated Butacite® polyvinyl butyral sheet and a XIR®-70 HP Auto film (a product of the Southwall Company) (auto film) is produced in the following manner. The decorated polymer sheet (12 inches by 12 inches (305 mm×305 mm)), the undecorated PVB sheet (12 inches by 12 inches (305 mm×305 mm) by 15 mils thick (0.38 mm)) and the solar control film are conditioned at 23% relative humidity (RH) at a temperature of 72° F. overnight. The laminate is produced by stacking a clear annealed float glass plate layer (12 inches by 12 inches (305 mm×305 mm) by 2.5 mm thick), the decorated polymer sheet, the undecorated PVB sheet, the solar control film, a thin Teflon® film layer (12 inches by 12 inches (305 mm×305 mm)) and a second clear annealed float glass plate layer (12 inches by 12 inches (305 mm×305 mm) by 2.5 mm thick). The layers are stacked such that the metallized surface of the XIR®-70 HP Auto film is in contact with the undecorated PVB sheet. The glass/decorated polymer sheet/undecorated PVB sheet/solar control film/Teflon® film/glass laminate is then placed into a vacuum bag and heated to 90°-100° C. for 30 minutes to remove any air contained between the glass/decorated polymer sheet/undecorated PVB sheet/solar control film/Teflon® film/glass laminate layers to form a pre-press assembly. The pre-press assembly is then subjected to autoclaving, cooling and removal from the autoclave as described in Example 1 to produce an autoclaved glass/decorated polymer sheet/undecorated PVB sheet/solar control film/Teflon® film/glass laminate. Removal of the second glass sheet and the thin Teflon® film provides the glass/decorated polymer sheet/undecorated PVB sheet/solar control film laminate.

Example 11

Using the ink set of Example 1, an image is applied to a 15 mil thick (0.38 mm) Butacite® polyvinyl butyral sheet by ink jet printing with an Epson 3000 printer to provide a ink coverage of 300 percent. An adhesive composition consisting of a solution of A-1100 silane (0.05 wt. % based on the total weight of the solution, a product of the Silquest Company, believed to be gamma-aminopropyltrimethoxysilane), acetic acid (0.01 wt. % based on the total weight of the solution) isopropanol (66.63 wt. percent based on the total weight of the solution) and water (33.31 wt. % based on the total weight of the solution) is prepared. A 12-inch by 12-inch piece of the decorated Butacite® sheet is dipped into the silane solution (residence time of about 1 minute), removed and allowed to drain and dry under ambient conditions to form a decorated polymer sheet. A glass laminate composed of a glass layer, the decorated polymer sheet, an undecorated Butacite® polyvinyl butyral (PVB) sheet, a XIR®-70 HP film (a product of the Southwall Company) (solar control film), a second undecorated Butacite® sheet, and a second glass layer is produced in the following manner. The decorated polymer sheet (12 inches by 12 inches (305 mm×305 mm)), the undecorated PVB sheets (12 inches by 12 inches (305 mm×305 mm) by 15 mils thick (0.38 mm)) and the solar control film (12 inches by 12 inches (305 mm×305 mm) by 1 mil (0.026 mm) thick) are conditioned at 23% relative humidity (RH) at a temperature of 72° F. overnight. The laminate is produced by stacking a clear annealed float glass plate layer (12 inches by 12 inches (305 mm×305 mm) by 2.5 mm thick), the decorated polymer sheet layer, the undecorated PVB sheet layer, the solar control film layer, a second undecorated PVB sheet layer, and a second clear annealed float glass plate layer (12 inches by 12 inches (305 mm×305 mm) by 2.5 mm thick). The glass/decorated polymer sheet/undecorated PVB sheet/solar control film/undecorated PVB sheet/glass laminate is then placed into a vacuum bag and heated to 90°-100° C. for 30 minutes to remove any air contained between the glass/decorated polymer sheet/undecorated PVB sheet/solar control film/undecorated PVB sheet/glass laminate layers to form a pre-press assembly. The pre-press assembly is then subjected to autoclaving, cooling and removal from the autoclave as described in Example 1 to produce an autoclaved glass/decorated polymer sheet/undecorated PVB sheet/solar control film/undecorated PVB sheet/glass laminate.

Example 12

Using the ink set of Example 1, an image is applied to a 30 mil thick (0.75 mm) Butacite® polyvinyl butyral sheet of Example 1 by ink jet printing with an Epson 3000 printer to provide a ink coverage of 75%, thereby forming a decorated polymer sheet. A glass laminate composed of a glass layer, the decorated polymer sheet, a XIR®-75 Auto Blue V-1 film (solar control film, a product of the Southwall Company), a SentryGlas® Plus sheet (a product of the DuPont Company) and a second glass layer is produced in the following manner. The decorated polymer sheet (12 inches by 12 inches (305 mm×305 mm)), the solar control film (12 inches by 12 inches (305 mm×305 mm) by 1.8 mils (0.046 mm) thick) and the SentryGlas® Plus sheet (12 inches by 12 inches (305 mm×305 mm) by 60 mils (1.52 mm) thick) are conditioned at 23% relative humidity (RH) at a temperature of 72° F. overnight. The laminate is prepared by stacking a clear annealed float glass plate layer (12 inches by 12 inches (305 mm×305 mm) by 3 mm thick), the decorated polymer sheet layer, the solar control film, the SentryGlas® Plus sheet and a clear annealed float glass plate layer (12 inches by 12 inches (305 mm×305 mm) by 3 mm thick). The glass/decorated polymer sheet/solar control film/SentryGlas® Plus sheet/glass laminate is then placed into a vacuum bag and heated to 90°-100° C. for 30 minutes to remove any air contained between the glass/decorated polymer sheet/solar control film/SentryGlas® Plus sheet/glass layers to form a pre-press assembly. The pre-press assembly is then subjected to autoclaving, cooling and removal from the autoclave as described in Example 1 to produce an autoclaved glass/decorated polymer sheet/solar control film/SentryGlas® Plus sheet/glass laminate.

Example 13

Using the ink set of Example 1, an image is applied to a 15 mil thick (0.38 mm) Butacite® polyvinyl butyral sheet of Example 1 by ink jet printing with an Epson 3000 printer to provide a ink coverage of 50%, thereby forming a decorated polymer sheet. A glass laminate composed of a glass layer, the decorated polymer sheet, a XIR®-70 HP film (solar control film) (a product of the Southwall Company), an undecorated PVB sheet and a second glass layer is produced in the following manner. The decorated polymer sheet (12 inches by 12 inches (305 mm×305 mm)), the undecorated PVB sheet (12 inches by 12 inches (305 mm×305 mm) by 15 mils (0.38 mm) and the solar control film (12 inches by 12 inches (305 mm×305 mm) by 1 mil (0.026 mm) thick) are conditioned at 23% relative humidity (RH) at a temperature of 72° F. overnight. The laminate is produced by stacking a clear annealed float glass plate layer (12 inches by 12 inches (305 mm×305 mm) by 3 mm thick), the decorated polymer sheet layer, the solar control film layer, the undecorated PVB sheet and a second clear annealed float glass plate layer (12 inches by 12 inches (305 mm×305 mm) by 3 mm thick). The glass/decorated polymer sheet/solar control film/undecorated PVB sheet/glass laminate is then placed into a vacuum bag and heated to 90°-100° C. for 30 minutes to remove any air contained between the glass/decorated polymer sheet/solar control film/undecorated PVB sheet/glass laminate layers to form a pre-press assembly. The pre-press assembly is then subjected to autoclaving, cooling and removal from the autoclave as described in Example 1 to form an autoclaved glass/decorated polymer sheet/solar control film/undecorated PVB sheet/glass laminate.

Example 14

Using the ink set of Example 1, an image is applied to a 15 μl thick (0.38 m) Butacite® poly(vinyl butyral) sheet of Example 1 by ink jet printing with an Epson 3000 printer to provide a ink coverage of 100%, thereby forming a decorated polymer sheet. A glass laminate composed of a glass layer, the decorated polymer sheet, a XIR®-70 HP film (solar control film) (a product of the Southwall Company), an Evasafe® ethylene vinyl acetate sheet (a product of the Bridgestone Company) and a glass layer is produced in the following manner. The decorated polymer sheet (12 inches by 12 inches (305 mm×305 mm)), the solar control film (12 inches by 12 inches (305 mm×305 mm) by 1 mil (0.026 mm) thick) and the Evasafe® ethylene vinyl acetate (EVA) sheets (12 inches by 12 inches (305 mm×305 mm) by 15 mils (0.38 mm) thick) are conditioned at 23% relative humidity (RH) at a temperature of 72° F. overnight. The laminate is produced by stacking a glass plate layer (12 inches by 12 inches (305 mm×305 mm) by 3 mm thick), the decorated polymer sheet layer, the solar control film layer, the EVA sheet layer and a second clear annealed float glass plate layer (12 inches by 12 inches (305 mm×305 mm) by 3 mm thick). The glass/decorated polymer sheet/solar control film/EVA sheet/glass laminate is then placed into a vacuum bag and heated to 90°-100° C. for 30 minutes to remove any air contained between the glass/decorated polymer sheet/solar control film/EVA sheet/glass laminate layers to produce a pre-press assembly. The pre-press assembly is then subjected to autoclaving, cooling and removal from the autoclave as described in Example 1 to produce an autoclaved glass/decorated polymer sheet/solar control film/EVA sheet/glass laminate.

Example 15

Using the ink set of Example 1, an image is applied to a 15 mil thick (0.38 mm) Butacite® polyvinyl butyral sheet of Example 1 by ink jet printing with an Epson 3000 printer to provide a ink coverage of 200%, thereby forming a decorated polymer sheet. A glass laminate composed of a Solex® green glass layer, the decorated polymer sheet, a XIR®-70 HP film (solar control film) (a product of the Southwall Company), an undecorated Butacite® polyvinyl butyral (PVB) sheet layer and a second glass layer is produced in the following manner. The decorated polymer sheet (12 inches by 12 inches (305 mm×305 mm)), the solar control film (12 inches by 12 inches (305 mm×305 mm) by 1 mil (0.026 mm) thick) and the undecorated PVB sheet (12 inches by 12 inches (305 mm×305 mm) by 15 mils thick (0.38 mm)) are conditioned at 23% relative humidity (RH) at a temperature of 72° F. overnight. The laminate is produced by stacking a Solex® green glass plate layer (12 inches by 12 inches (305 mm×305 mm) by 2.5 mm thick), the decorated polymer sheet layer, the solar control film layer, the undecorated PVB sheet layer and a clear annealed float glass plate layer (12 inches by 12 inches (305 mm×305 mm) by 3 mm thick). The green glass/decorated polymer sheet/solar control film/undecorated PVB sheet/glass laminate is then placed into a vacuum bag and heated to 90°-100° C. for 30 minutes to remove any air contained between the green glass/decorated polymer sheet/solar control film/undecorated PVB sheet/glass laminate layers to form a pre-press assembly. The pre-press assembly is then subjected to autoclaving, cooling and removal from the autoclave as described in Example 1 to form an autoclaved green glass/decorated polymer sheet/solar control film/undecorated PVB sheet/glass laminate.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A laminate comprising (1) a polymer sheet comprising plasticized polyvinyl butyral, said plasticized polyvinyl butyral comprising a polyvinyl butyral polymer and about 15 to about 80 parts of plasticizer per hundred parts of polyvinyl butyral and, optionally, one or more additives selected from the group consisting of an adhesion control additive, an anti-oxidant, an ultraviolet absorbers, an ultraviolet stabilizer, a thermal stabilizer, a hindered amine light stabilizer, a colorant, a processing aid, a flow enhancing additive, a lubricant, a pigment, a dye, a flame retardant, an impact modifier, a nucleating agent, an antiblocking agent, a dispersant, a surfactant, a chelating agent and a coupling agent; said polymer sheet having upper and lower surfaces, and said polymer sheet having a thickness of at least about 0.75 mm, wherein at least a portion of at least one of said upper or lower surfaces consists essentially of an image disposed directly on at least ten percent of said upper or lower surfaces of said polymer sheet; (2) at least one layer of a biaxially oriented poly(ethylene terephthalate) film that is a solar control film; and (3) an adhesive composition, wherein said adhesive composition consists of one or both of gamma-aminopropyl-triethoxysilane and N-beta-(aminoethyl)-gamma-aminopropyl-trimethoxysilane; wherein said adhesive composition is disposed on one hundred percent of said at least one surface bearing said image; and wherein said adhesive composition forms a coating having a thickness of about 0.026 mm or less; and wherein said image is disposed between said coating and said at least one surface.

2. The laminate of claim 1 wherein at least one image is disposed on each of said upper and lower surfaces of said sheet.

3. The laminate of claim 1 wherein the image is applied using an ink-jet ink and an ink-jet printing device.

4. The laminate of claim 3 wherein the ink-jet ink comprises at least one pigment selected from the group consisting of pigments having the Color Index PY 120, PY 155, PY 128, PY 180, PY9S, PY 93, PV19, PR 202, PR 122, PB 15:4, PB 15:3, and PBI 7.

5. The laminate of claim 1 wherein the coating has a thickness of 0.013 mm or less.

6. The laminate of claim 1 wherein the coating has a thickness of 0.0026 mm or less.

7. The laminate of claim 1 wherein the solar control film comprises: indium tin oxide; antimony tin oxide; or lanthanum hexaboride.

8. The laminate of claim 7 wherein the solar control film is an IR-reflective film.

9. The laminate of claim 1 wherein the solar control film has been treated to enhance adhesion.

10. The laminate of claim 9 wherein the film solar control has been treated with adhesives, primers, silanes, poly(allyl amine), flame treatments, plasma treatments, electron beam treatments, oxidation treatments, corona discharge treatments, chemical treatments, chromic acid treatments, hot air treatments, ozone treatments, ultraviolet light treatments, sand blast treatments, or solvent treatments.

11. The laminate of claim 10 wherein the solar control film has been treated with a flame treatment, a silane, or a poly(allyl amine).

* * * * *